US011558157B2

(12) United States Patent
Rakib et al.

(10) Patent No.: US 11,558,157 B2
(45) Date of Patent: *Jan. 17, 2023

(54) FIXED WIRELESS ACCESS USING ORTHOGONAL TIME FREQUENCY SPACE MODULATION

(71) Applicant: Cohere Technologies, Inc., Santa Clara, CA (US)

(72) Inventors: Shlomo Selim Rakib, Santa Clara, CA (US); Ronny Hadani, Santa Clara, CA (US); Richard Benner, Santa Clara, CA (US); Robert Fanfelle, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/303,436

(22) Filed: May 28, 2021

(65) Prior Publication Data

US 2021/0399852 A1 Dec. 23, 2021

Related U.S. Application Data

(63) Continuation of application No. 16/432,666, filed on Jun. 5, 2019, now Pat. No. 11,025,377, which is a (Continued)

(51) Int. Cl.
*H04L 5/00* (2006.01)
*H01Q 21/24* (2006.01)
(Continued)

(52) U.S. Cl.
CPC ........... *H04L 5/0023* (2013.01); *H01Q 21/24* (2013.01); *H04B 7/0697* (2013.01); *H04B 7/12* (2013.01); *H04L 5/003* (2013.01); *H04L 5/0007* (2013.01)

(58) Field of Classification Search
CPC ..... H04L 5/0023; H04L 5/0007; H04L 5/003; H04B 7/0697; H04B 7/12; H01Q 21/24
See application file for complete search history.

(56) References Cited

U.S. PATENT DOCUMENTS

| 4,754,493 A | 6/1988 | Coates |
| 5,083,135 A | 1/1992 | Nagy et al. |
| (Continued) | | |

FOREIGN PATENT DOCUMENTS

| WO | 2011150315 | 12/2011 |
| WO | 2013148546 | 10/2013 |
| (Continued) | | |

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.

(Continued)

*Primary Examiner* — Parth Patel
(74) *Attorney, Agent, or Firm* — Perkins Coie LLP

(57) ABSTRACT

A fixed wireless access system is implemented using orthogonal time frequency space multiplexing (OTFS). Data transmissions to/from different devices share transmission resources using—delay Doppler multiplexing, time-frequency multiplexing, multiplexing at stream and/or layer level, and angular multiplexing. Time-frequency multiplexing is achieved by dividing the time-frequency plan into subgrids, with the subsampled time frequency grid being used to carry the OTFS data. Antenna implementations include a hemispherical antenna with multiple antenna elements arranged in an array to achieve multiplexing.

20 Claims, 36 Drawing Sheets

Related U.S. Application Data continuation of application No. PCT/US2017/064777, filed on Dec. 5, 2017.

(60) Provisional application No. 62/430,255, filed on Dec. 5, 2016.

(51) Int. Cl.
*H04B 7/06* (2006.01)
*H04B 7/12* (2006.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,689,049 B2 * | 3/2010 | Monro ............... H04N 19/97 382/232 |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,779,983 B1 * | 7/2014 | Lam ..................... H01Q 25/00 343/700 MS |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,667,148 B1 | 5/2020 | Hadani et al. |
| 10,681,568 B1 | 6/2020 | Hadani et al. |
| 10,693,581 B2 | 6/2020 | Rakib et al. |
| 10,693,692 B2 | 6/2020 | Hadani et al. |
| 10,716,095 B2 | 7/2020 | Rakib et al. |
| 10,749,651 B2 | 8/2020 | Hebron et al. |
| 10,826,728 B2 | 11/2020 | Tsatsanis et al. |
| 10,855,425 B2 | 12/2020 | Kons et al. |
| 10,873,418 B2 | 12/2020 | Kons et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 * | 1/2010 | Baraniuk ............... G01S 7/32 342/25 F |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |

(56) References Cited

U.S. PATENT DOCUMENTS

| | | |
|---|---|---|
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0063590 A1* | 3/2017 | Dhananjay .......... H04L 27/2602 |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288913 A1 | 10/2017 | Rakib et al. |
| 2017/0289961 A1 | 10/2017 | Rakib et al. |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |
| 2021/0194732 A1 | 6/2021 | Kons et al. |

FOREIGN PATENT DOCUMENTS

| | | |
|---|---|---|
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017044501 | 3/2017 |
| WO | 2017087706 | 5/2017 |
| WO | 2017100666 | 6/2017 |
| WO | 2017147439 | 8/2017 |
| WO | 2017165697 | 9/2017 |
| WO | 2017173160 | 10/2017 |
| WO | 2017173389 | 10/2017 |
| WO | 2017201467 | 11/2017 |
| WO | 2018031938 | 2/2018 |
| WO | 2018031952 | 2/2018 |
| WO | 2018032016 | 2/2018 |
| WO | 2018064587 | 4/2018 |
| WO | 2018064605 | 4/2018 |
| WO | 2018106731 | 6/2018 |
| WO | 2018129554 | 7/2018 |
| WO | 2018140837 | 8/2018 |
| WO | 2018191309 | 10/2018 |
| WO | 2018195548 | 10/2018 |
| WO | 2018200567 | 11/2018 |
| WO | 2018200577 | 11/2018 |
| WO | 2019014332 | 1/2019 |
| WO | 2019032142 | 2/2019 |
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019060596 | 5/2019 |
| WO | 2019089986 | 5/2019 |
| WO | 2019113046 | 6/2019 |
| WO | 2019157230 | 8/2019 |
| WO | 2019173775 | 9/2019 |
| WO | 2019241436 | 12/2019 |
| WO | 2019241589 | 12/2019 |
| WO | 2020142520 | 7/2020 |
| WO | 2020206304 | 10/2020 |
| WO | 2020227619 | 11/2020 |

(56) References Cited

FOREIGN PATENT DOCUMENTS

| WO | 2020247768 | 12/2020 |
|----|------------|---------|
| WO | 2021026212 | 2/2021  |
| WO | 2021062354 | 4/2021  |

OTHER PUBLICATIONS

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.

Catt, "UL ACK/NACK transmission methods for LTE-A," 3GPP TSG RAN WG1 Meeting #60bis, R1-102453, Beijing, China, Apr. 12-16, 2010, 8 pages.

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).

Nehorai, A. et al., "MURI: Adaptive waveform design for full spectral dominance (2005-2010)," AFOSR FA9550-05-1-0443, Final Report, [online], Mar. 11, 2011 Retrieved on Mar. 11, 2013, Retrieved from the Internet <URL: http://oai.dtic.mil/oai/oai?verb=getRecord&metadataPrefix=html&identifier=ADA565420>, 103 pages.

\* cited by examiner

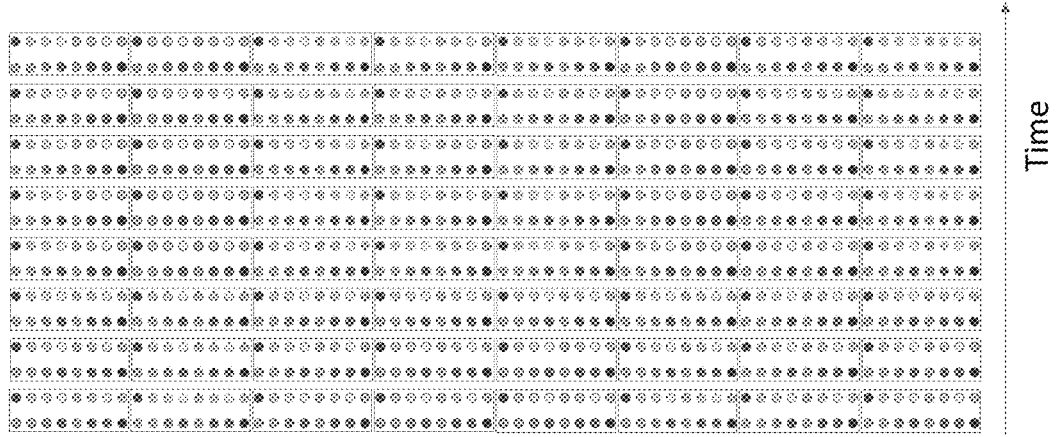
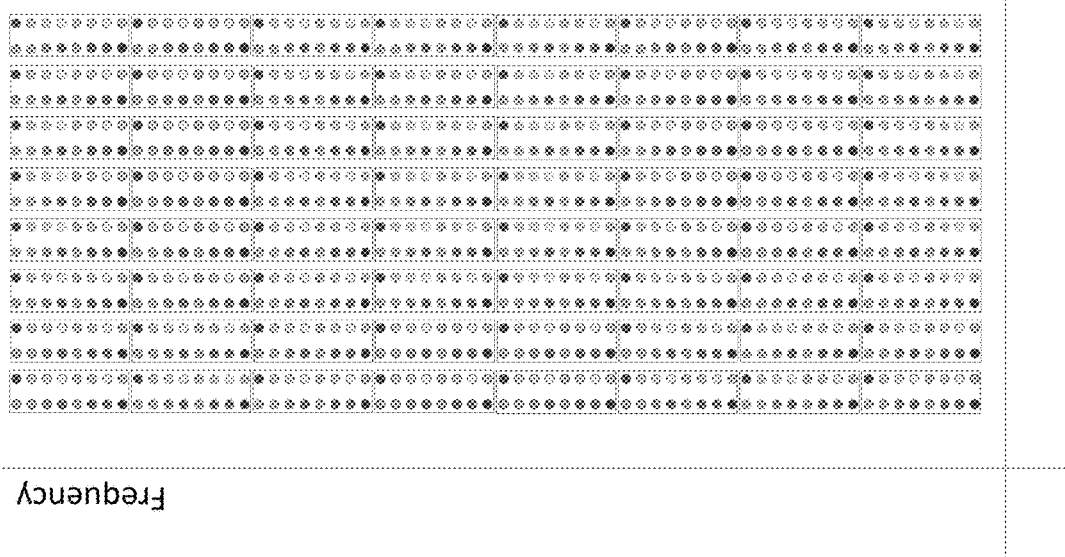
FIG. 7

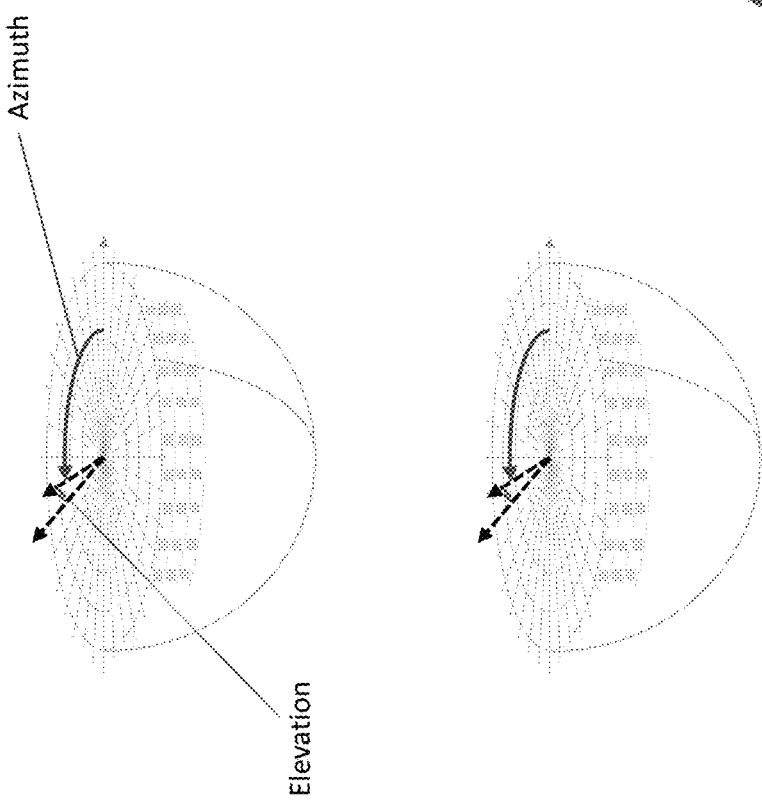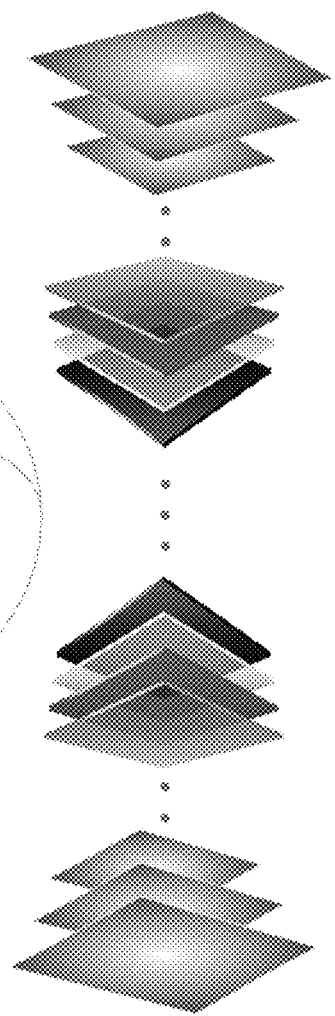
FIG. 12

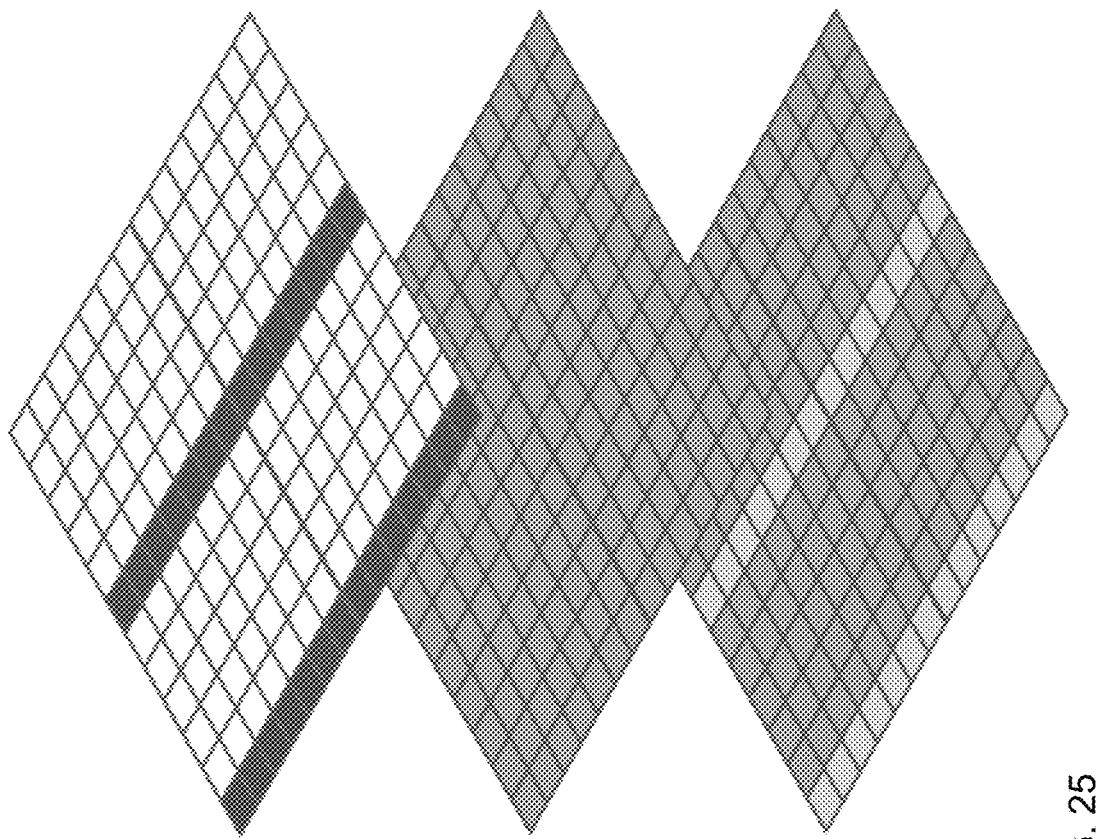
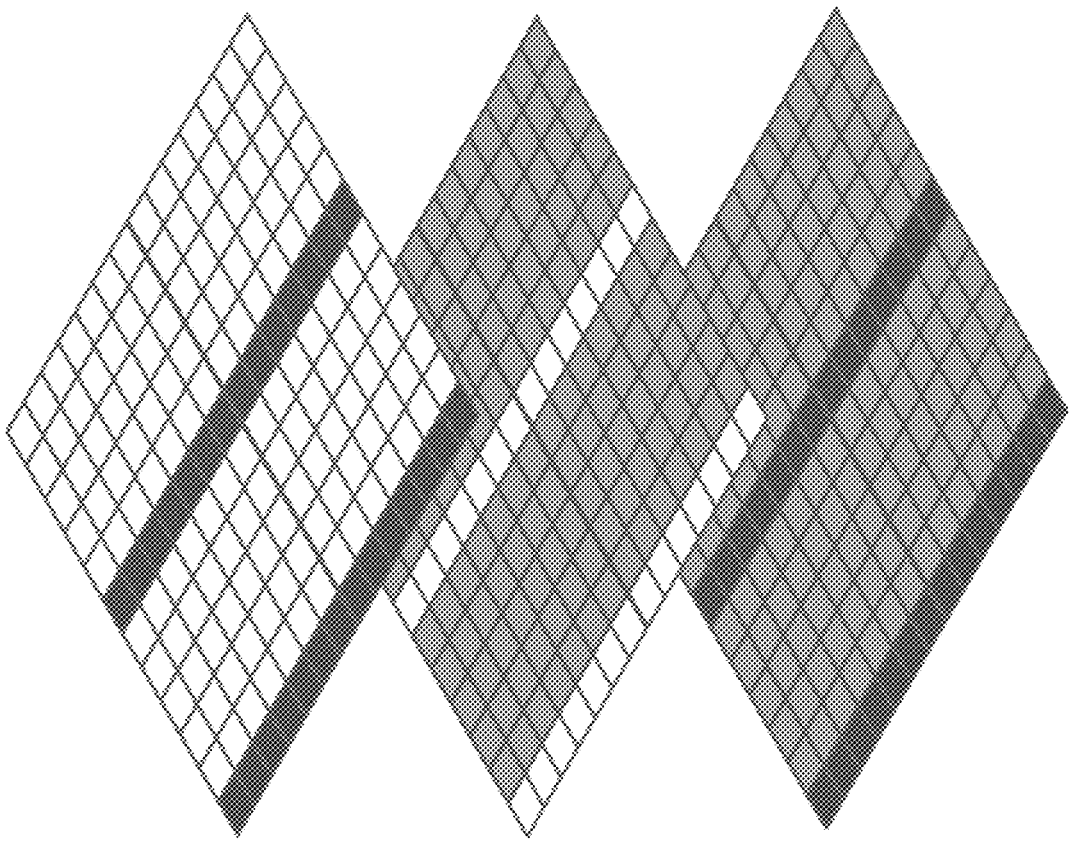
FIG. 25

| Parameter | LTE | OTFS | |
|---|---|---|---|
| Type of Reference Signal | CRS | $N=14, M=1$ | $N=14, M=1$ |
| # of antenna ports (AP) | 4 | 20 | 88 |
| Total Overhead | 14.3% | 7.1% | 7.1% |
| Overhead per AP | (3.6% per AP) | (0.36% per AP) | (0.08% per AP) |
| Supported Channel with no CSI Degradation | ETU-200 | ETU-200 | ETU-50 |

FIG. 29

FIXED WIRELESS ACCESS USING ORTHOGONAL TIME FREQUENCY SPACE MODULATION

PRIORITY CLAIM

The present patent document is a continuation of U.S. patent application Ser. No. 16/432,666, entitled "FIXED WIRELESS ACCESS USING ORTHOGONAL TIME FREQUENCY SPACE MODULATION" filed on Jun. 5, 2019 which is a continuation of PCT Application No. PCT/US2017/064777, entitled "FIXED WIRELESS ACCESS USING ORTHOGONAL TIME FREQUENCY SPACE MODULATION" filed on Dec. 5, 2017 which claims priority to U.S. Provisional Patent Application No. 62/430,255 entitled "FIXED WIRELESS ACCESS USING ORTHOGONAL TIME FREQUENCY SPACE MODULATION" filed on Dec. 5, 2016. The entire content of the aforementioned patent application is incorporated by reference as part of the disclosure of this patent document.

TECHNICAL FIELD

The present document relates to wireless communication, and more particularly, transmission and reception of data.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for fixed wireless access using orthogonal time frequency space (OTFS) modulation.

In one example aspect, an antenna system is disclosed. The antenna includes a substantially planar portion, a hemispherical dome attached to the substantially planar portion at a base of the hemispherical dome, and one or more antenna elements positioned within the hemispherical dome, each antenna element communicatively coupled to a data feed and being able to transmit and/or receive data bursts according to a transmission scheme.

In another example aspect, a fixed wireless access point that uses a Luneburg type antenna for data transmission is disclosed.

In yet another example aspect, a method of data transmissions wherein the data transmissions are transmitted to multiple receivers and data transmissions for the multiple receivers are multiplexed using at least one of time-frequency multiplexing, delay-Doppler domain multiplexing, a spatial multiplexing and a stream/layer multiplexing is disclosed. In yet another aspect, transmission tower for use at an access point in a fixed wireless access system is disclosed. The transmission tower includes one or more antenna systems that achieve time-frequency multiplexing, and a base station configured to transmit and receive data from a plurality of user devices and a network backhaul.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 7 shows an example of a time frequency grid on which user data is assigned to sixteen subgrids of resources.

FIG. 12 shows an example of a 4 MIMO antenna beam pattern.

FIG. 25 pictorially depicts examples of insertion of a pilot signal and overlay of a pilot signal.

FIG. 29 is a tabular comparison of reference signal examples in LTE and OTFS implementations.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. Unless otherwise noted, abbreviations and concepts used in the present document are consistent with generally well-known 3GPP terminology.

Figure 1A:
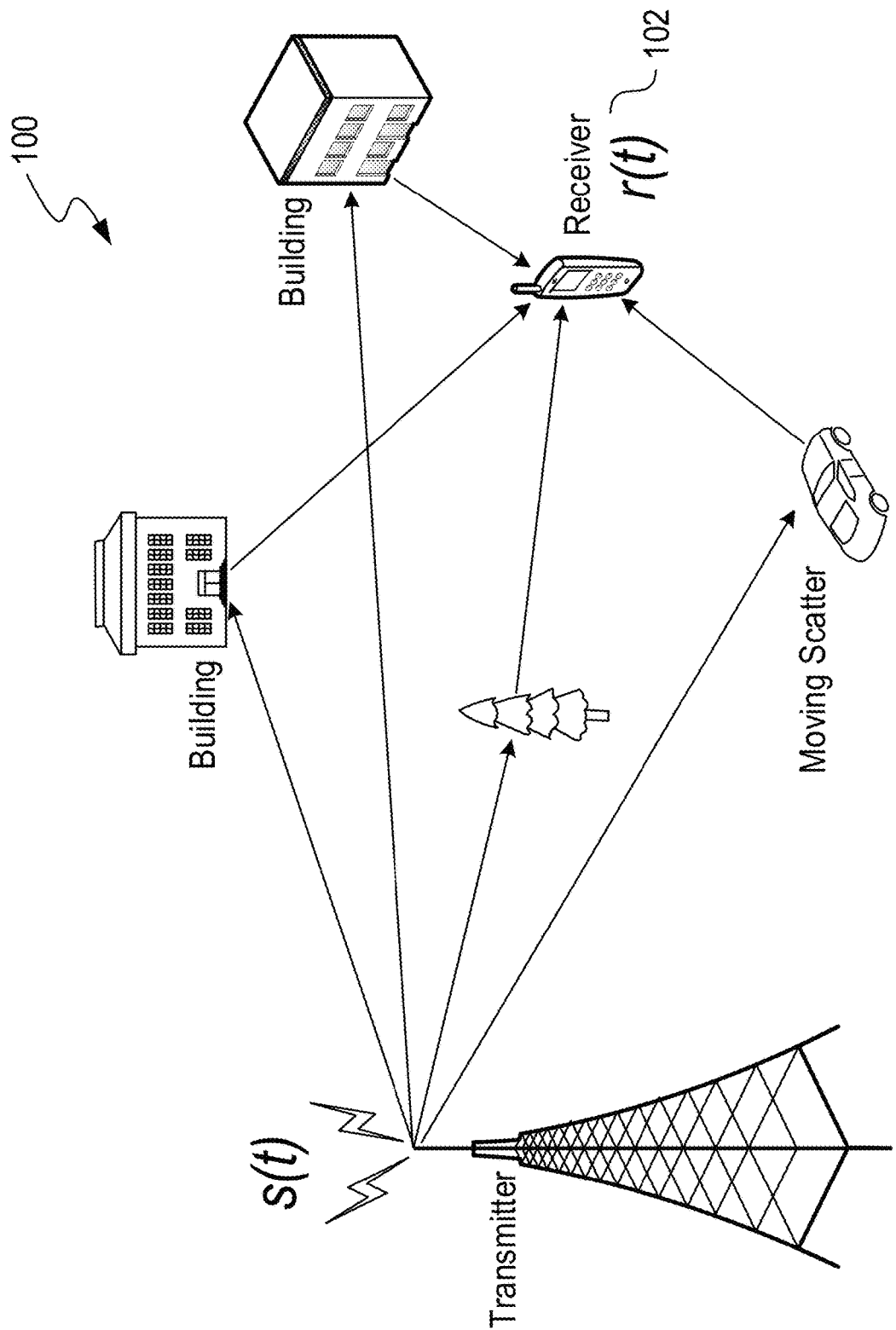
FIG. 1A shows an example communication network.

FIG. 1A shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102 or at the transmitter (e.g., a base station).

Figure 1B:
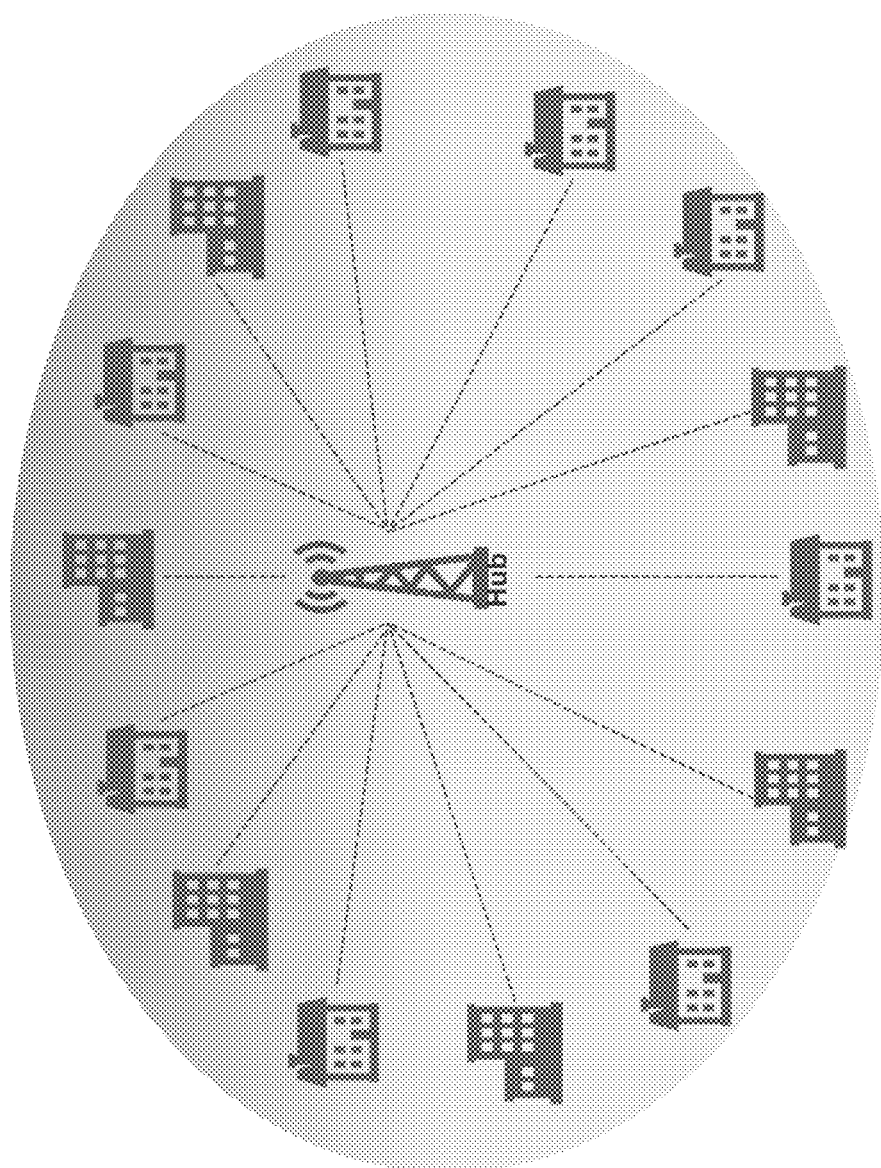
FIG. 1B shows an example of a fixed wireless access system.

FIG. 1B shows an example of a fixed wireless access system. A hub, that includes a transmission facility such as a cell tower, is configured to send and receive transmissions to/from multiple locations. For example, the locations could be user premises or business buildings. As described throughout this document, the disclosed techniques can achieve very high cell capacity fixed wireless access, when compared to traditional fixed access technology. In one advantageous aspect, the transmissions may be performed on a relatively low frequency band that can be used to reduce the cost of deployment. For example, some competing systems have been proposed in the 60 GHz band, while the presently disclosed technologies could be deployed in the 3.5 to 5 GHz frequency band. In another advantageous aspect described in the present document, a pencil beam can be achieved for data transmission and used to multiplex transmissions to/from a large number of users that overlap in other transmission resources, such as time-frequency dimensions.

Figure 1C:
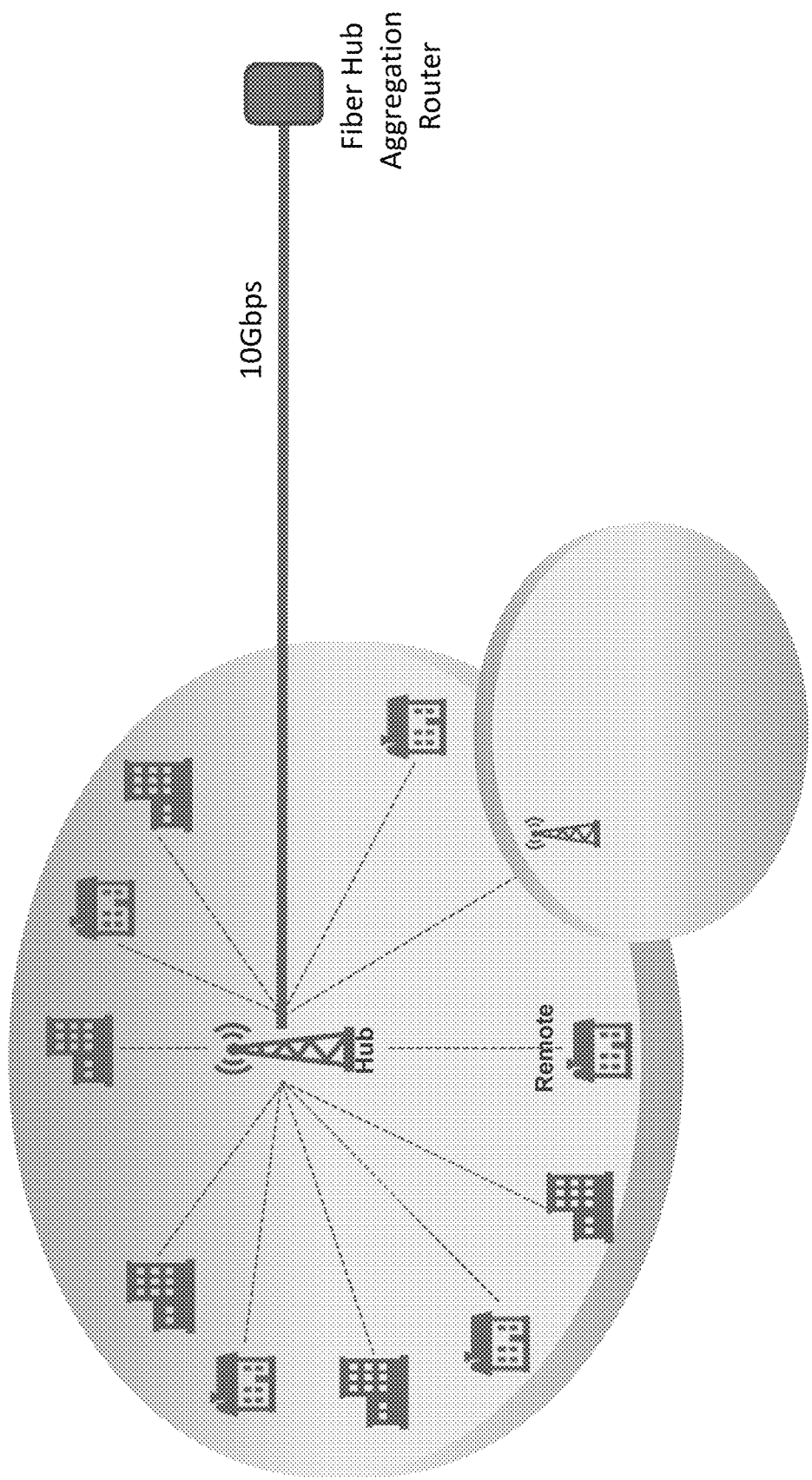
FIG. 1C shows yet another configuration of a fixed wireless access system.

FIG. 1C shows yet another configuration of a fixed access wireless communication system in which hops are used to reach users. For example, one cell tower may transmit/receive from another cell tower, which would then relay the transmissions between the principle cell tower and the users, thus extending range of the fixed wireless access system. A backhaul may connect the transmission tower with an aggregation router. For example, in one configuration, a 10 Gbps fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point.

As further described in this document, access multiplexing efficiency can be used by combining one or more of the following techniques—delay Doppler multiplexing, time-frequency multiplexing, multiplexing at stream and/or layer level, and angular multiplexing.

Time-frequency multiplexing may be achieved using an approach that divides the time-frequency resource grid for transmission into multiple subgrids. The subgrids may be of equal or different sizes. Each subgrid that is used for signal transmission will be used to carry a two dimensional delay-Doppler array. In some embodiments, the subgrid structure may occupy the entire time-frequency two-dimensional plane. Spacing between subgrids may account for maximum transmission delay and Doppler spread. This document provides additional details of the various multiplexing embodiments.

Figure 2:
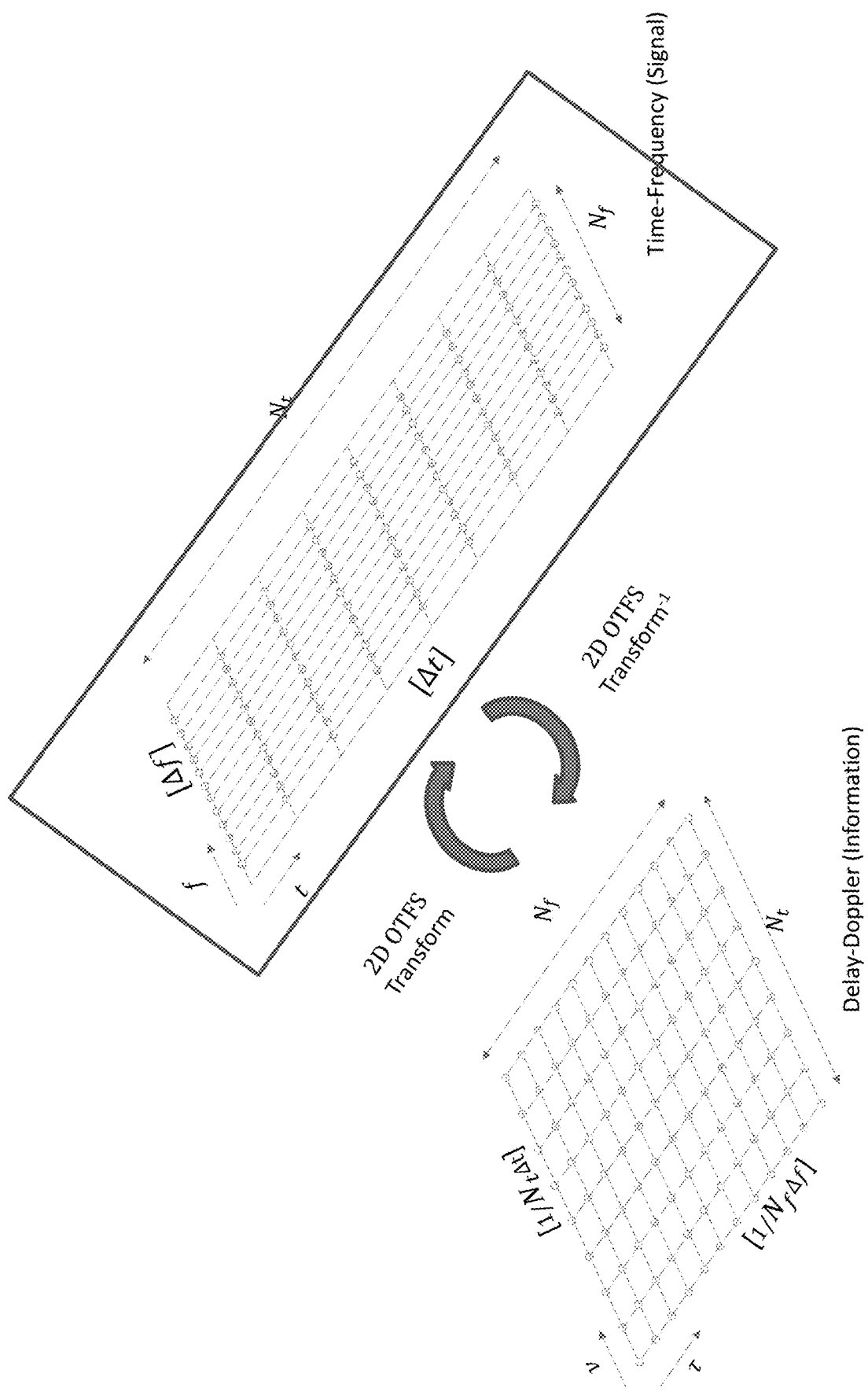
FIG. 2 shows an example of conversion of a signal between the delay-Doppler domain and the time-frequency domain.

FIG. 2 shows a pictorial representation of an example of conversion of a signal between the delay-Doppler domain and the time-frequency domain. The conversion from delay-Doppler domain to time-frequency domain may be achieved using a two-dimensional (2D) OTFS transform. The conversion of signals from time-frequency domain to the delay-Doppler domain may be achieved using an inverse 2D OTFS transform. In this figure, the OTFS QAM symbols reside on a grid or lattice of size N×M (N and M positive integers). The OTFS transform translates these QAM symbols to a lattice in the Time-Frequency plane of size M×N (note the swapping of axes—a result of the OTFS transform, as will be explained below). The OTFS Delay-Doppler lattice and the Time-Frequency multi-carrier lattice are related through a mathematical reciprocity relation intimately linked with the symplectic Fourier transform. In this Time-Frequency domain, one can think of the points along the frequency axis as the equivalent of an OFDM symbol, made up of M subcarriers. In the time dimension, we have the equivalent of N OFDM symbols, where N is a design parameter related to the Doppler spread of the channel.

Another observation worth noting in FIG. 2 is the fine resolution of the Delay-Doppler lattice. In the Delay-Doppler coordinate system, the delay or multipath resolution is given by the inverse of the bandwidth and the Doppler resolution is given by the inverse of the OTFS symbol time or observation time.

To summarize, in OTFS information symbols are indexed by points on a lattice or grid in the Delay-Doppler domain. Through the OTFS Transform each QAM symbol weights a 2D basis function defined in the Time-Frequency domain. The frequency domain samples at each time are transformed into time domain waveforms using filter banks.

Examples of Time Frequency Multiplexing

Figure 3:
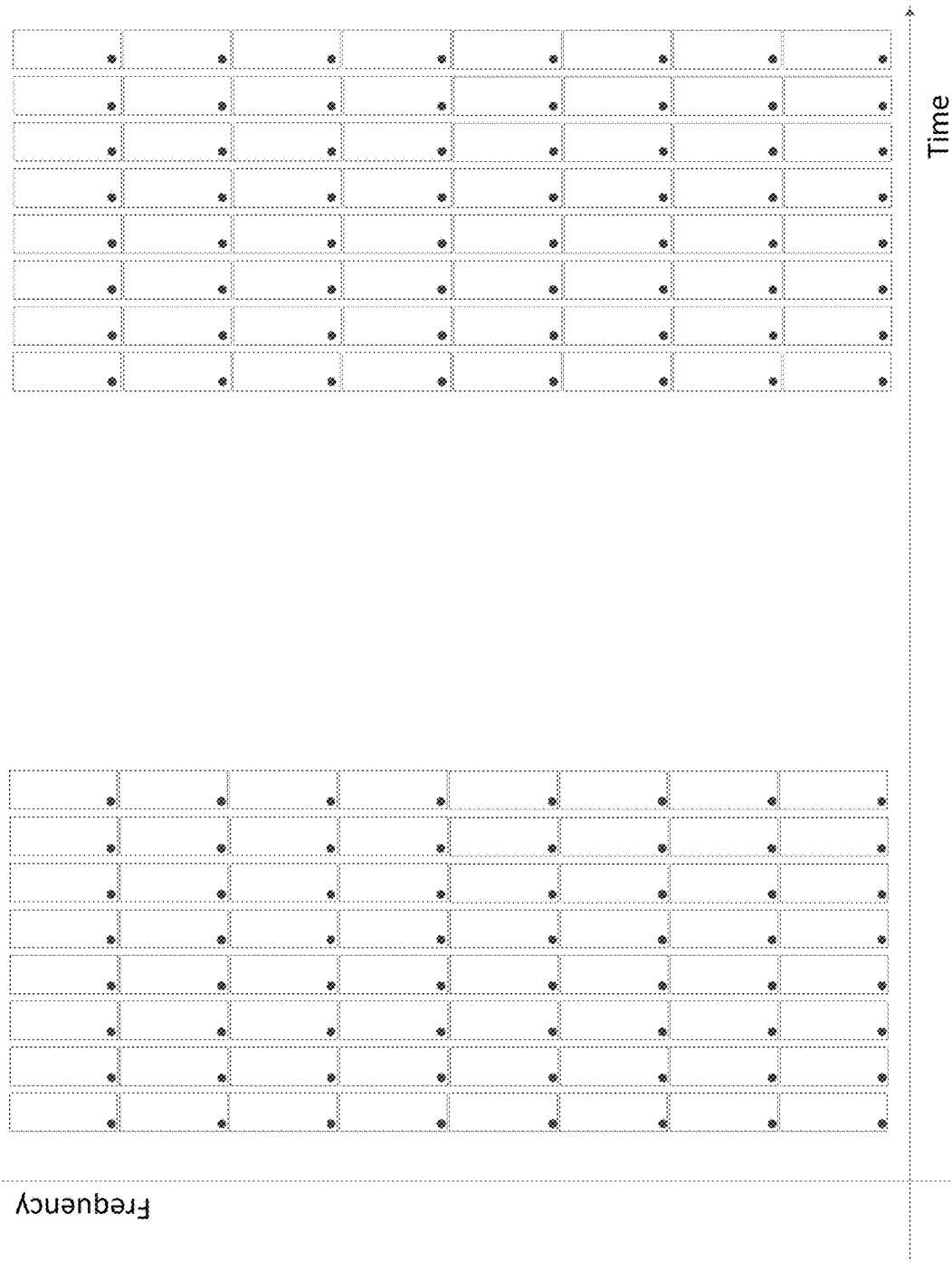
FIG. 3 shows an example of a time frequency grid on which user data is assigned subgrids of resources.

FIG. 3 shows an example of a time frequency grid on which user data is assigned subgrids of resources. In the depicted embodiments, subgrids are equal-sized and a 64×8 array spans the entire frequency at 1 msec time granularity per subgrid. In some embodiments, each subgrid may be used to carry transmission bursts of 64 to 512 bytes.

Figure 4:
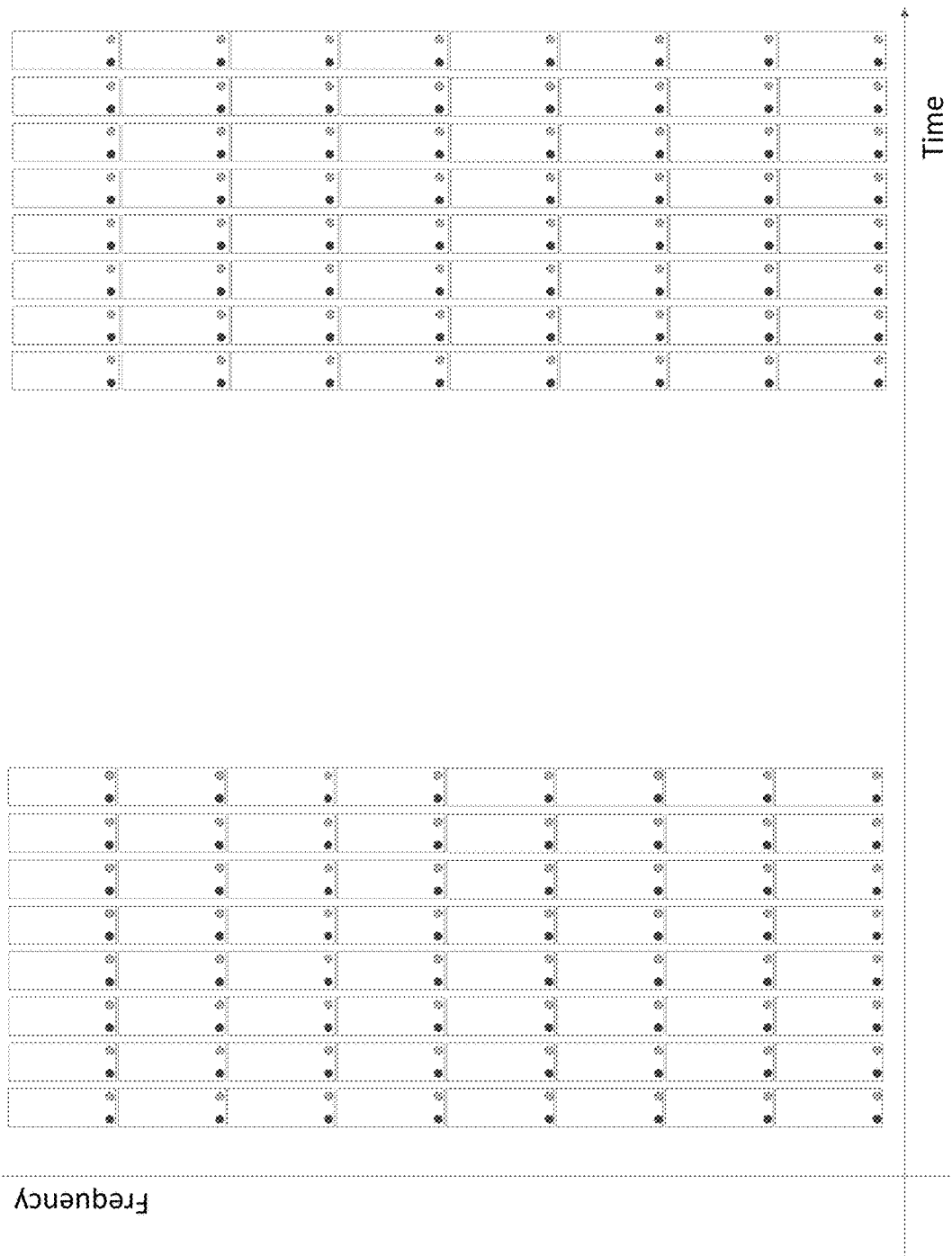
FIG. 4 shows an example of a time frequency grid on which user data is assigned to two subgrids of resources.

FIG. 4 shows an example of a time frequency grid on which user data is assigned to two subgrids of resources. As a result of using different time-frequency resources for the two users, data capacity can be doubled, while the use of subgrid is still sparse. The assignments to two users are illustrated via two different solid circles in each subgrid, representing the transmission resources for the users.

Figure 5:
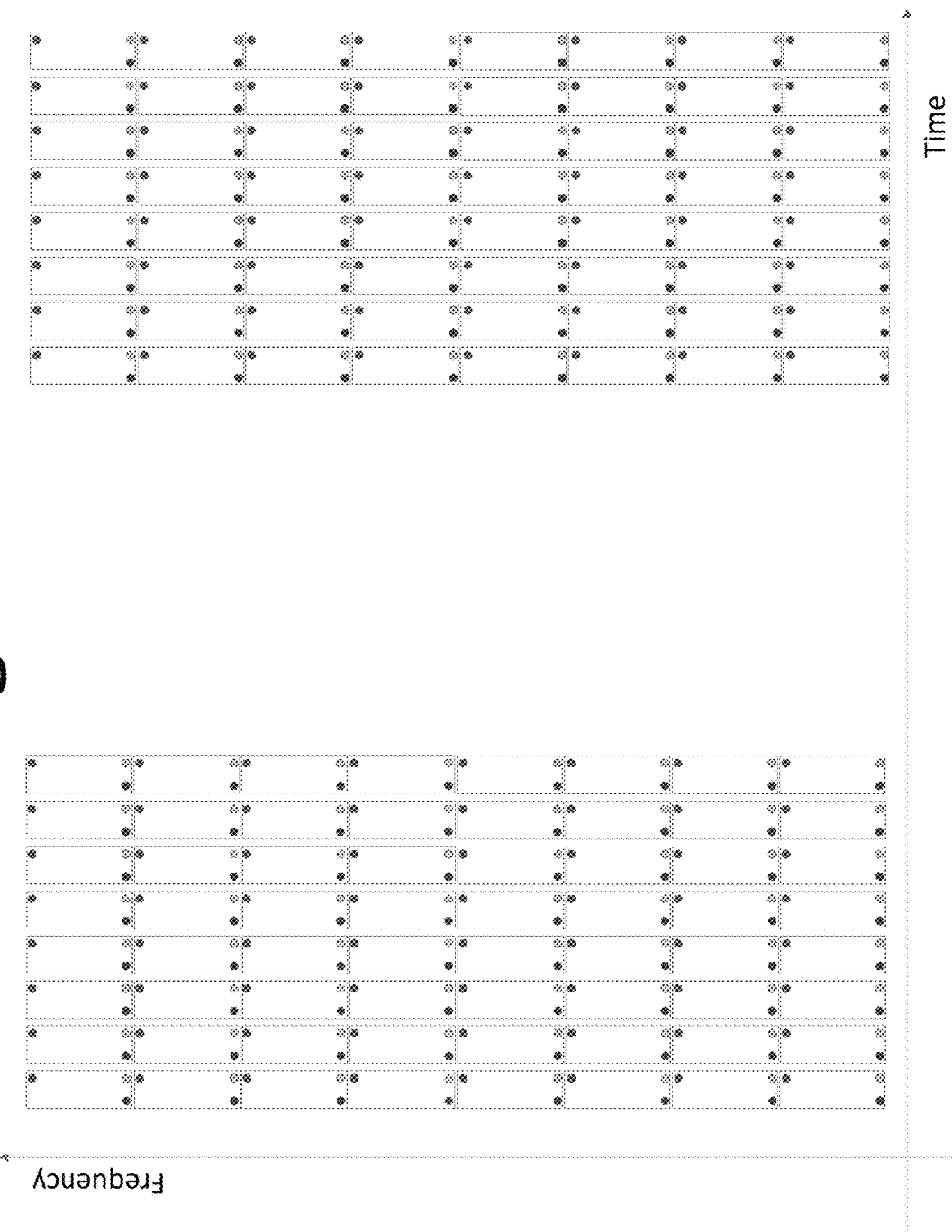
FIG. 5 shows an example of a time frequency grid on which user data is assigned to three subgrids of resources.

FIG. 5 shows an example of a time frequency grid on which user data is assigned in three subgrids of resources.

Figure 6:
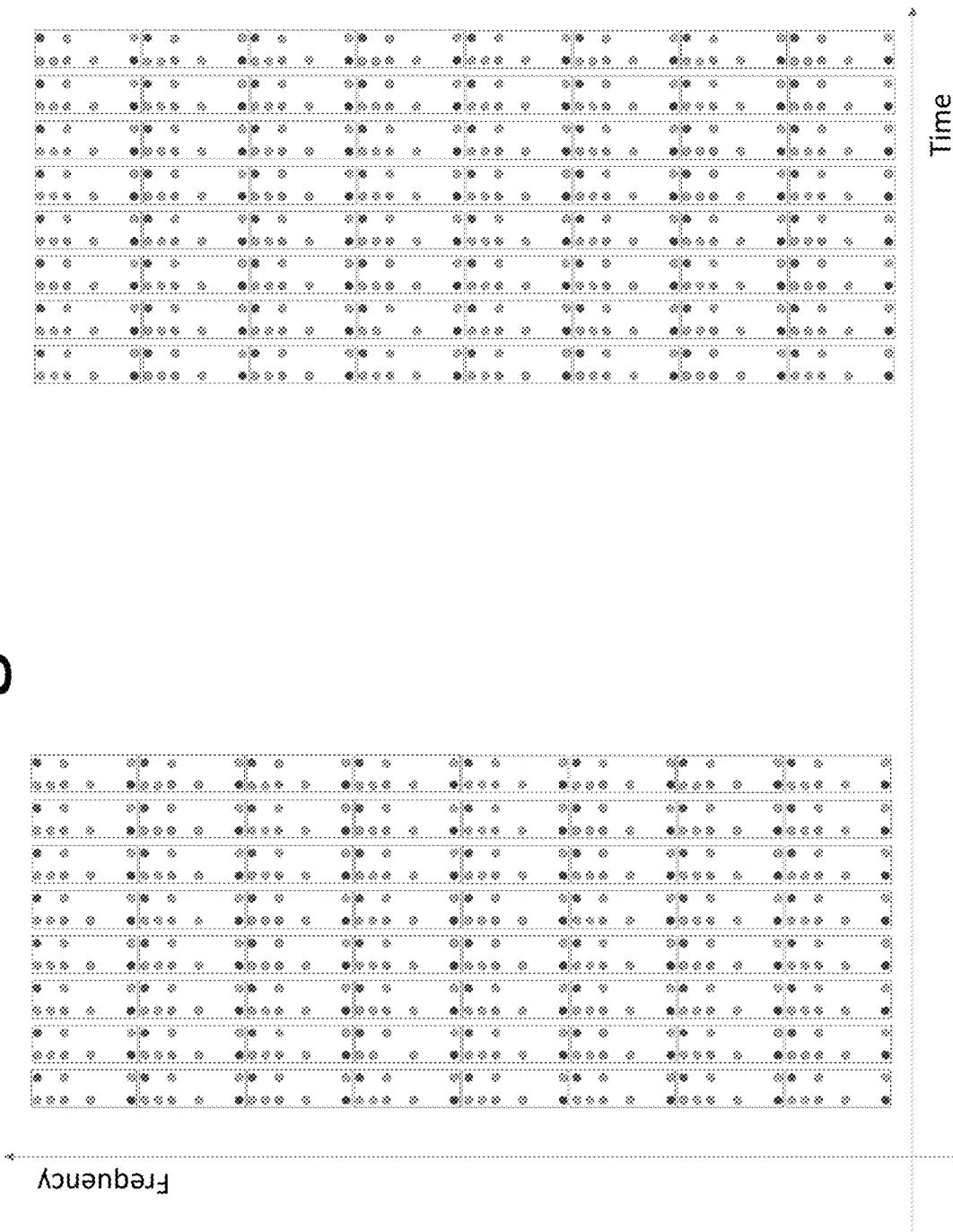
FIG. 6 shows an example of a time frequency grid on which user data is assigned to eight subgrids of resources.

FIG. 6 shows an example of a time frequency grid on which user data is assigned to eight subgrids of resources.

FIG. 7 shows an example of a time frequency grid on which user data is assigned to sixteen subgrids of resources. In this embodiment, the time frequency grid comprises 512×16 array, with 16 subgrids corresponding to data transmissions (64×8).

Figure 8:
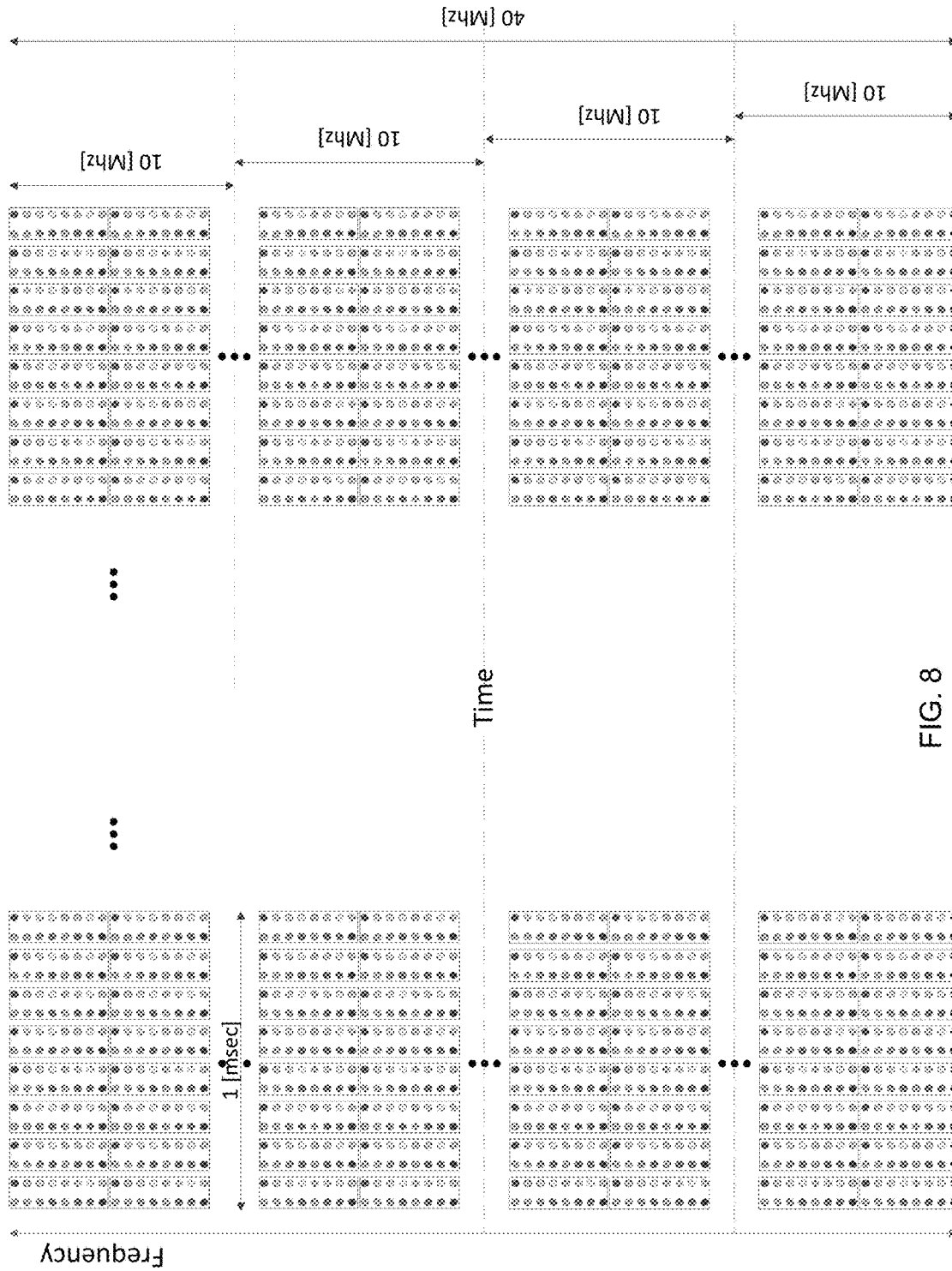
FIG. 8 shows an example of time-frequency resource assignment to four streams with 32 subsectors of transmission.

FIG. 8 shows an example of time-frequency resource assignment to four streams with 32 subsectors of transmission. In this embodiment, signal transmissions could be organized using 32 subsectors and 4 streams, divided into 4 subbands that are 10 MHz wide each, and corresponding to 1 msec transmission time interval (TTI) in a time division duplexing (TDD) transmission scheme.

Figure 9:
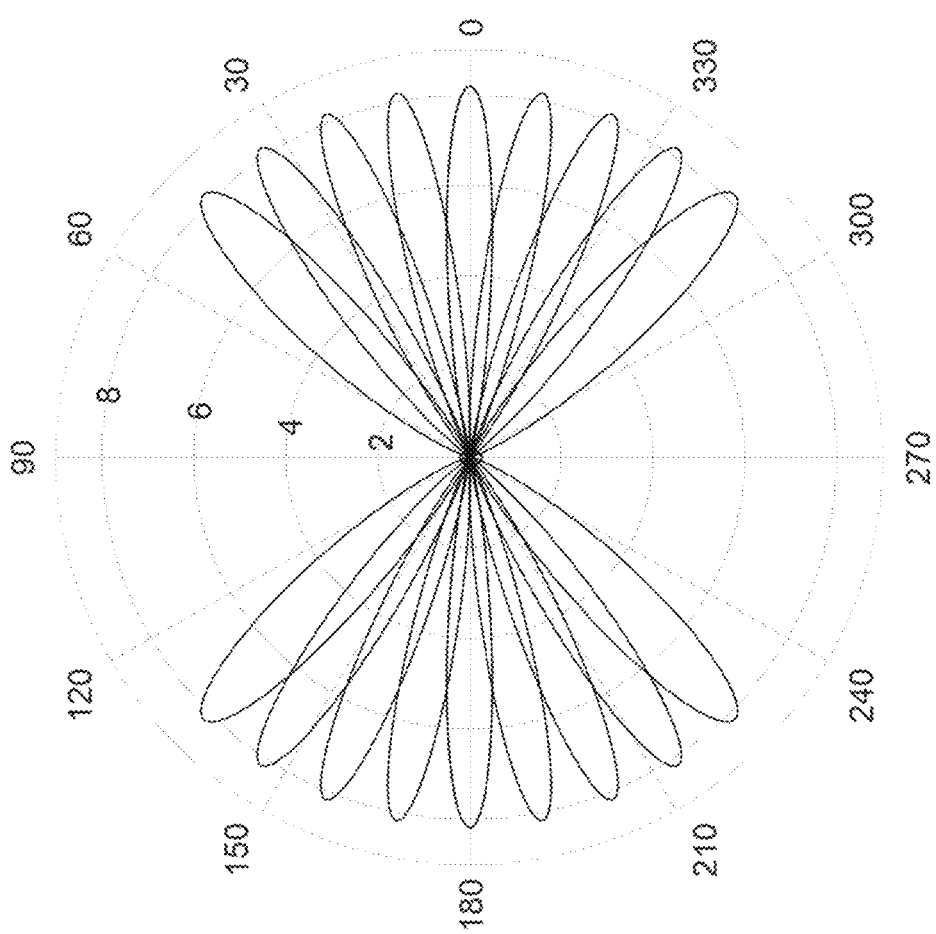
FIG. 9 shows an example of a beam pattern.

Examples of Spatial Multiplexing, Including Steam/Layer and Angular Multiplexing FIG. 9 shows an example of a beam pattern. One of the advantageous aspects of the disclosed technology is that inter-beam interference can be managed such that only two neighboring beams may potentially cause interference to each other. In this regard, the angular spread of transmission of a base station is controlled to be small. As a result of such planning, during signal processing stage to recover signals, the MIMO matrix of the received signal may be represented using a true tri-diagonal or a block-diagonal matrix. In other words, the off-diagonal elements may be represented by zeroes without having to suffer a quality loss due to rounding assumption. FIG. 9 shows an example of a beam pattern that can be used in such configurations.

Figure 10:
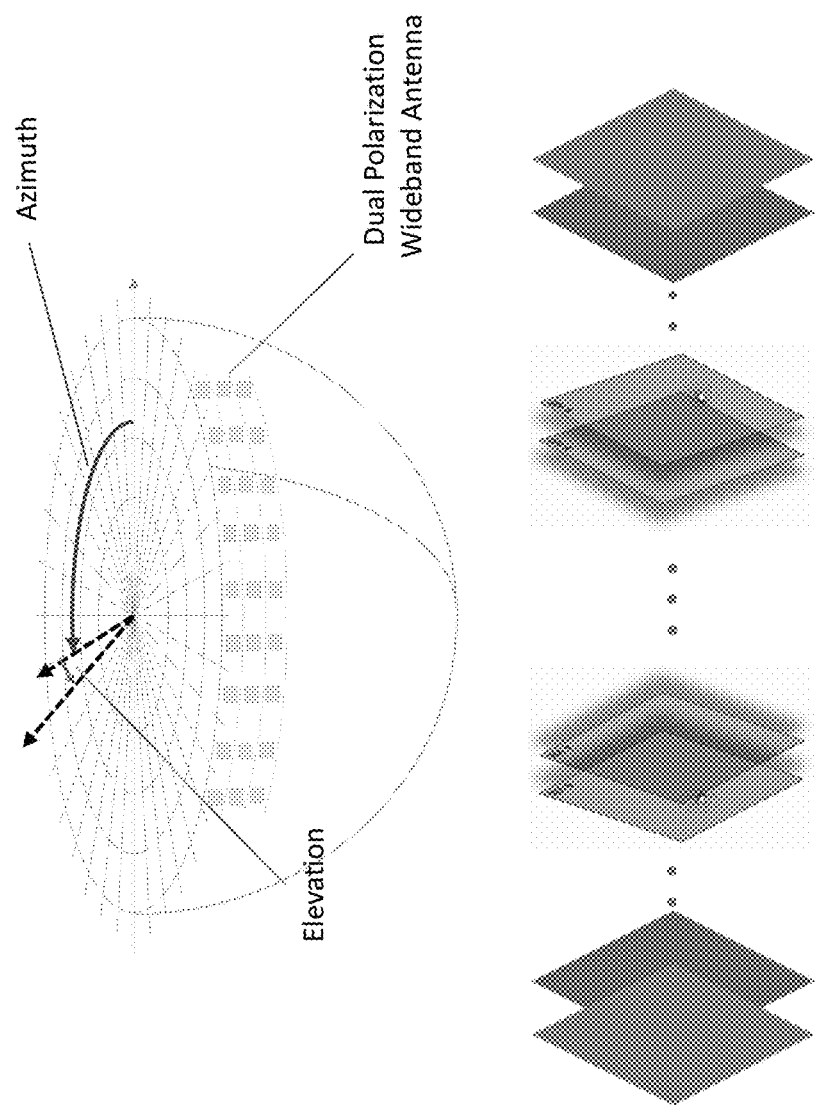
FIG. 10 shows an example of a dual polarization wideband antenna beam pattern.

FIG. 10 shows an example of a dual polarization wideband antenna beam pattern. As depicted, the antenna beam pattern could be controlled along three dimensions—elevation, azimuth and polarization plane, to achieve denser transmission of data (due to three dimensional multiplexing). In the depicted embodiment, a number of antenna elements are used in an array, with one dimension of the array controlling the azimuth of the transmission beam, another dimension controlling the elevation and each wideband antenna achieving dual MIMO for each sector (quadrant of coverage). Each antenna may be a dual polarization wideband antenna. Each antenna may be conformal to the hemispherical shape of the dome to avoid signal distortions and for mechanically snug fitting. The polarization aspect is pictorially depicted in the bottom part of the picture.

Figure 11:
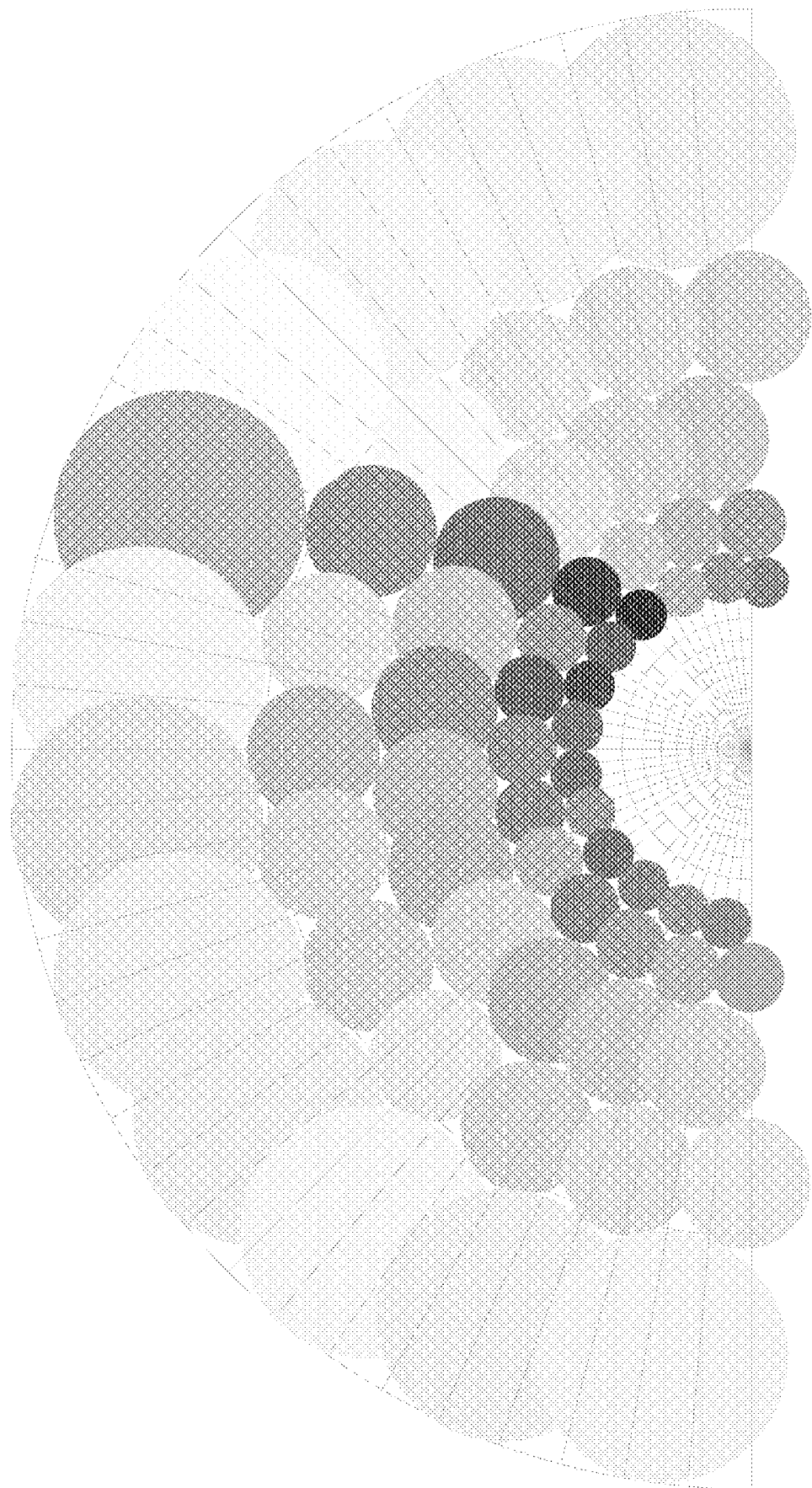
FIG. 11 shows the beam pattern footprint of an example of a 24 azimuth×5 elevation antenna beam.

FIG. 11 shows the beam pattern footprint of an example of a 24 azimuth×5 elevation antenna beam. As can be seen the coverage is uniform throughout the cell, with the antenna beam patterns arranged generally to be circular with radii growing outward from the access point or transmitter.

FIG. 12 shows an example similar to that depicted in FIG. 10, except that a 4 MIMO antenna configuration is used. As depicted in the bottom portion of the drawing, four layers of transmission may be used due to the antenna diversity. As shown, a two dimensional array of antenna elements (9 azimuth×3 elevation) provides a control over antenna beam pattern ubiquitously in the space.

Figure 13:
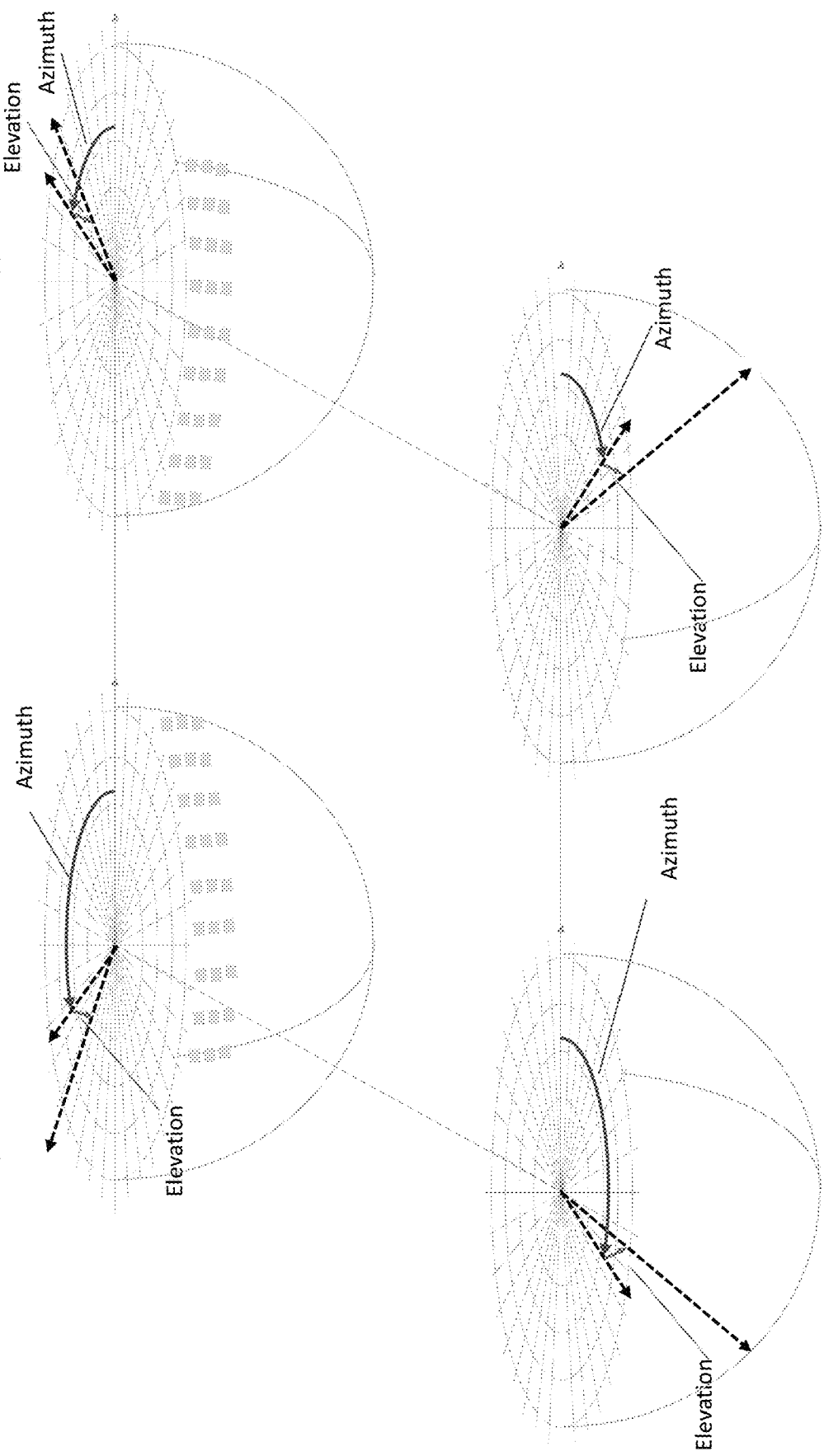
FIG. 13 shows an example of an antenna deployment to achieve full cell coverage using four quadrant transmissions.

FIG. 13 shows an example of an antenna deployment to achieve full cell coverage using four quadrant transmissions. Each antenna may provide coverage to one quadrant of a full 360 degree area, with collectively, all antennas together may provide uniform coverage throughout an entire 360 degree area.

Figure 14:
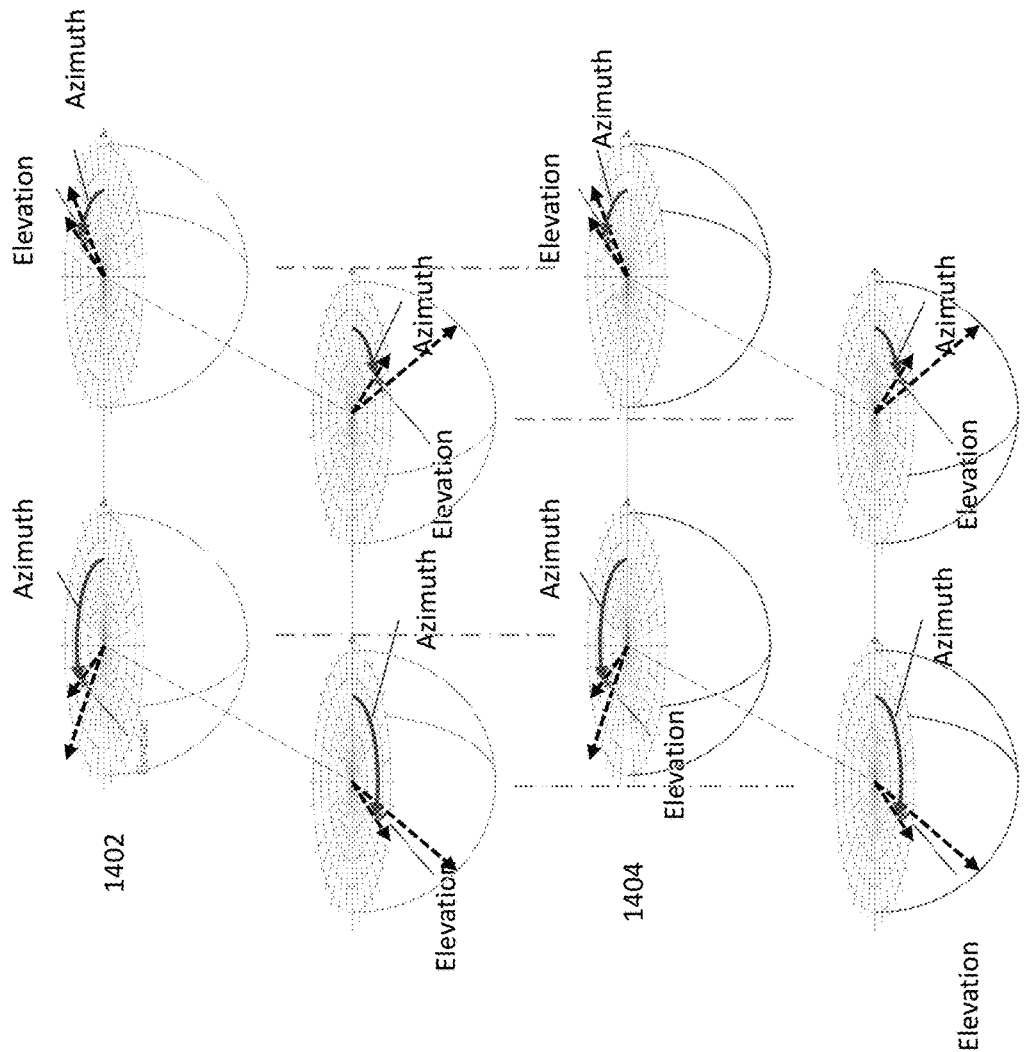
FIG. 14 shows an example of an antenna deployment to achieve full cell coverage using four quadrant transmissions in a 4 MIMO system.

FIG. 14 shows an example of an antenna deployment to achieve full cell coverage using four quadrant transmissions in a 4 MIMO antenna configuration system. As depicted, two pairs of four hemispherical antennas may be used, with each group of four antennas having a corresponding similar coverage orientation (e.g., patterns 1402 and 1404).

Figure 15A:
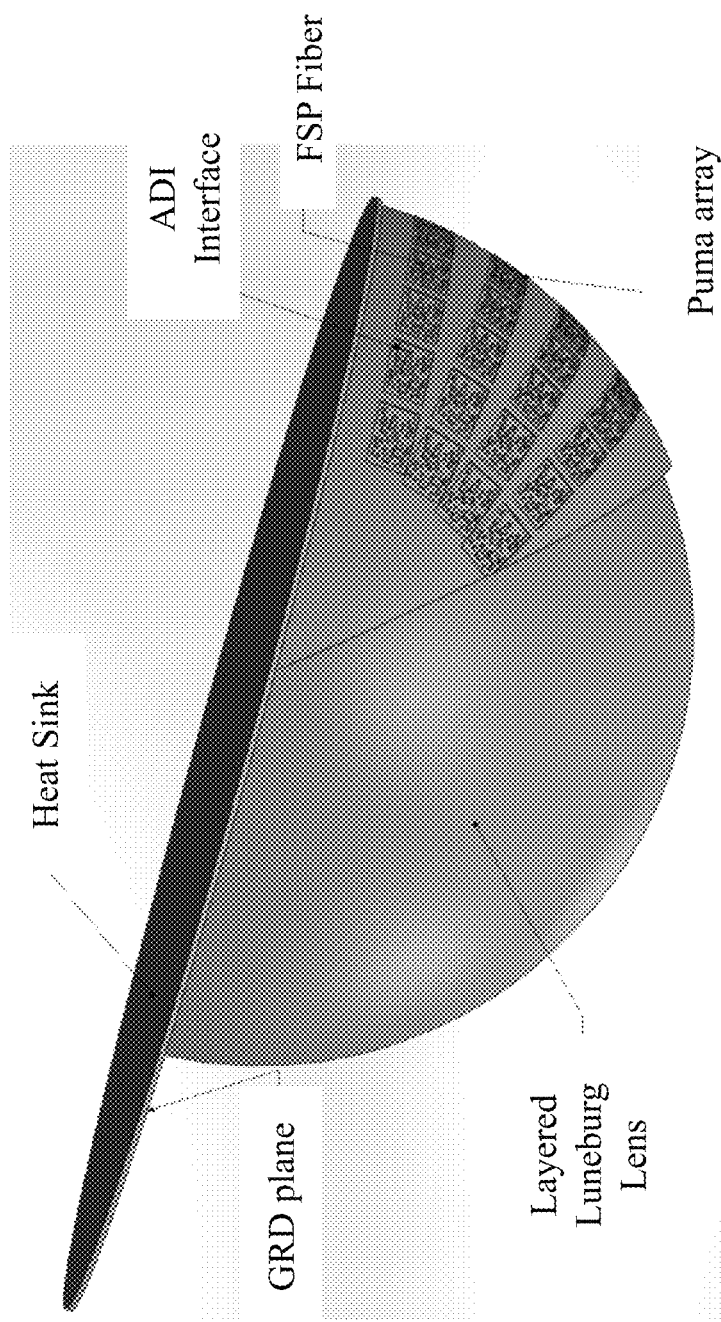
FIG. 15A illustrates an example embodiments of an antenna.

FIG. 15A illustrates an example embodiment of an antenna system. In the depicted embodiment, a Luneburg antenna configuration is used. Is shaped to be half-spherical with a generally planar base and a dome attached to the base. The antenna includes a hemispherical layered Luneburg lens, with a planar ultrawideband phased array (PUMA) antenna array arranged spherically near the spherical surface of the antenna. The planar portion is the ground plane and may include a heat sink for thermal regulation. The puma array is shown to have ADI interface and an interface with a high bandwidth network connection such as a fiber. The layered Luneburg lens may have dielectric layers of varying dielectric constants, arranged to provide focal point accuracy of transmission/reception.

Figure 15B:
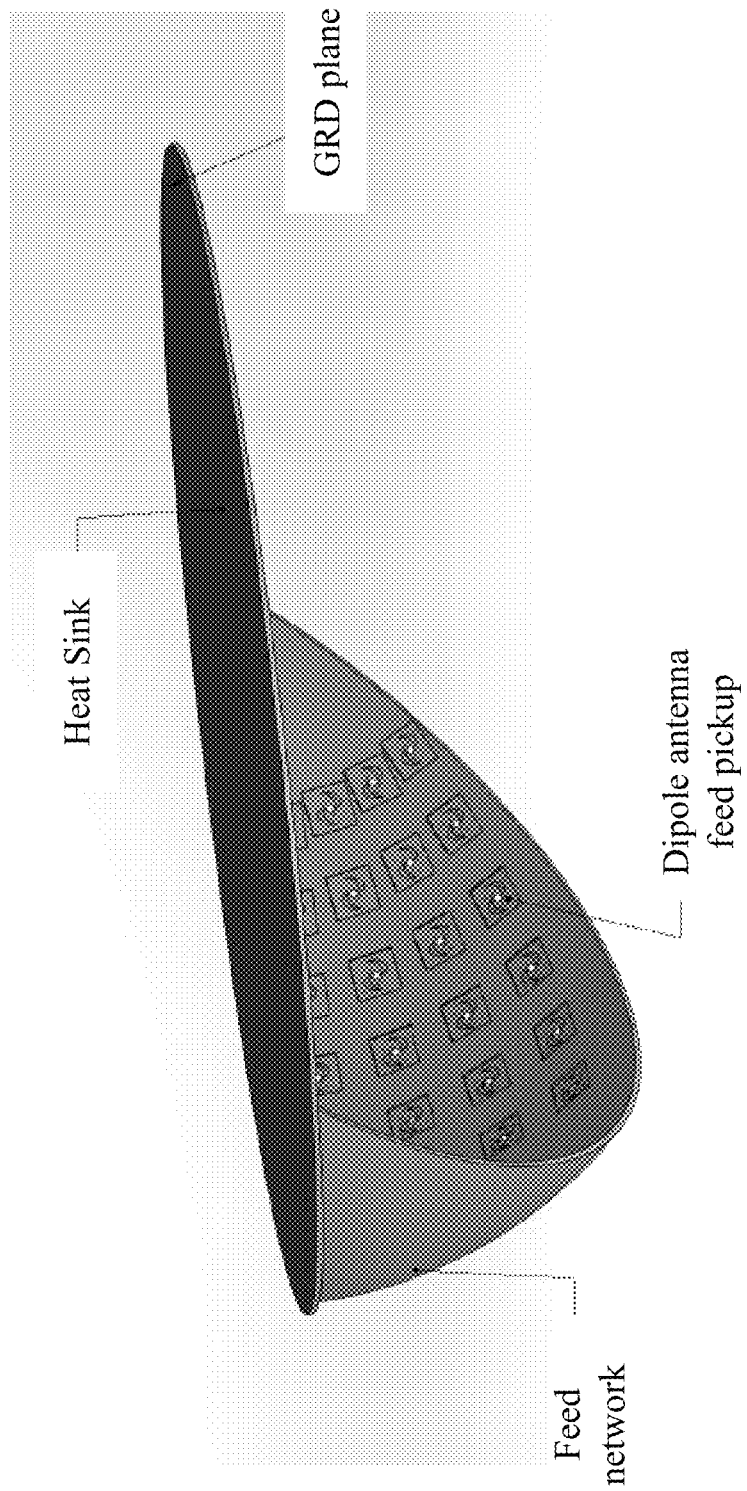
FIG. 15B illustrates an example embodiments of an antenna.

FIG. 15B illustrates another example embodiments of an antenna in which dipole antenna are used along the spherical surface of the hemispherical antenna. A feed network may be ohmically coupled to the dipole antenna feed to carry signals of transmission/reception.

Figure 15C:
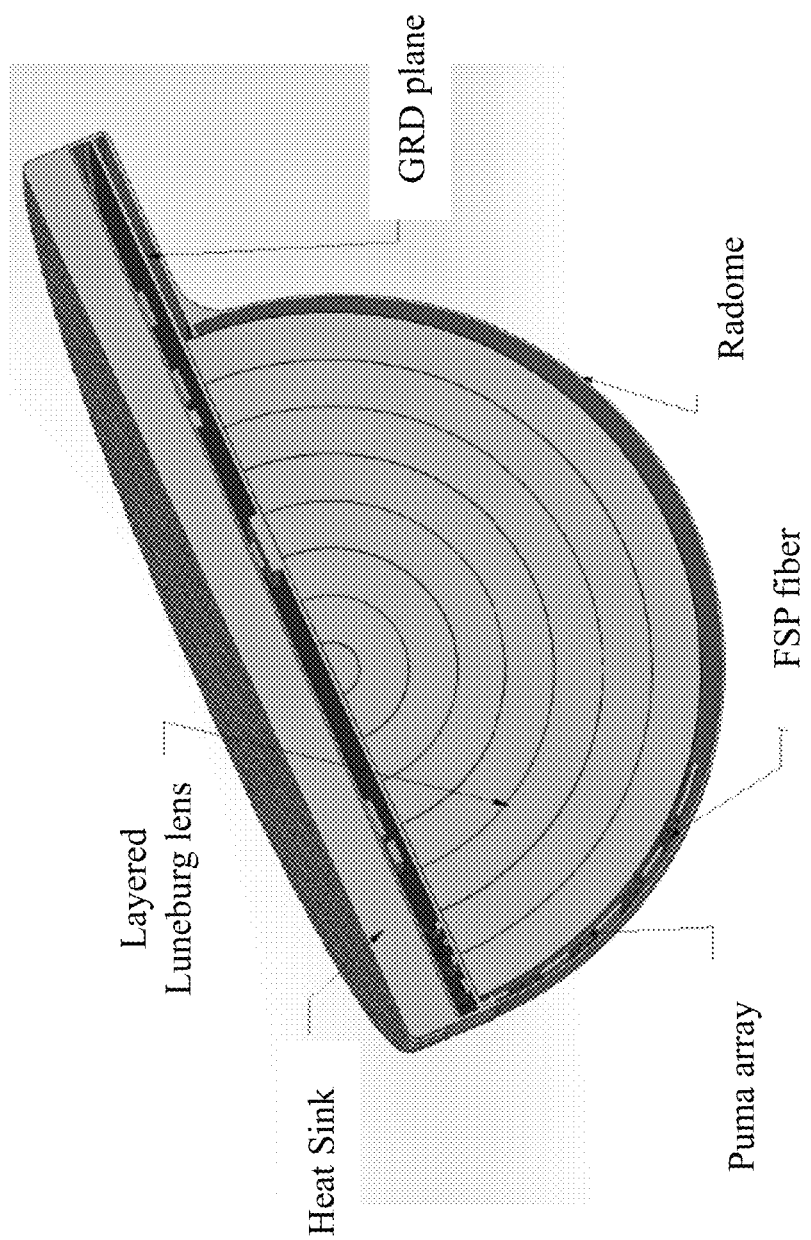
FIG. 15C illustrates an example embodiments of an antenna.

FIG. 15C illustrates an example embodiments of an antenna which shows a cut-out of the antenna element, showing a heat sink at the base of the antenna, with the hemispherical dome comprising layered Luneburg lens above the ground plane, a puma antenna array coupled to a fiber connection, and enclosed within a radome. The layered nature of antenna radome (e.g., layered Luneburg lens) is visible in this cut-out.

Figure 15D:
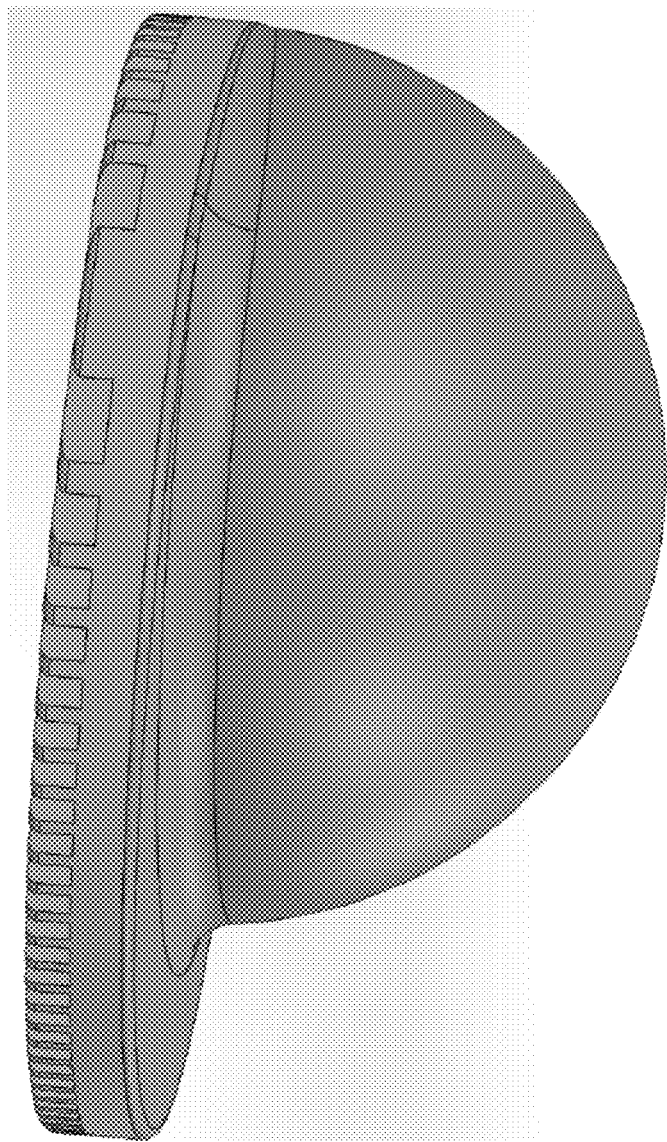
FIG. 15D illustrates an example embodiment of an antenna.

FIG. 15D illustrates an example embodiment of an antenna with the radome enclosure hiding the electronics and other parts of the antenna from view and from external environment.

Figure 16A:
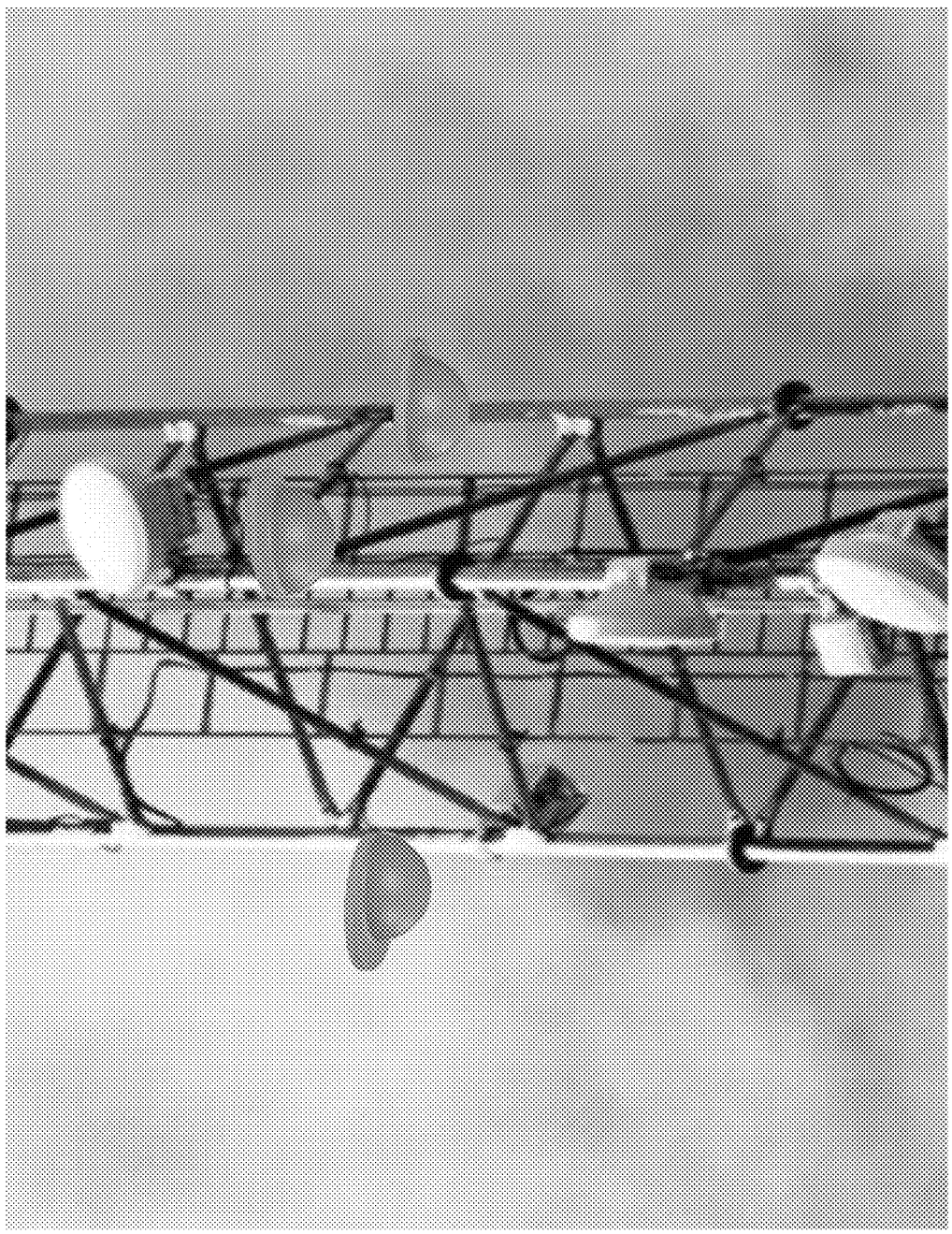
FIG. 16A shows an example of a cell tower configuration.

FIG. 16A shows an example of a cell tower configuration. A cell tower with existing antenna element deployments can be fitted with the disclosed antenna elements as depicted in the figure. In the depicted example, four antenna systems may be fitted to provide four quadrant coverage, thereby the cell tower providing a complete 360 degree coverage area.

Figure 16B:
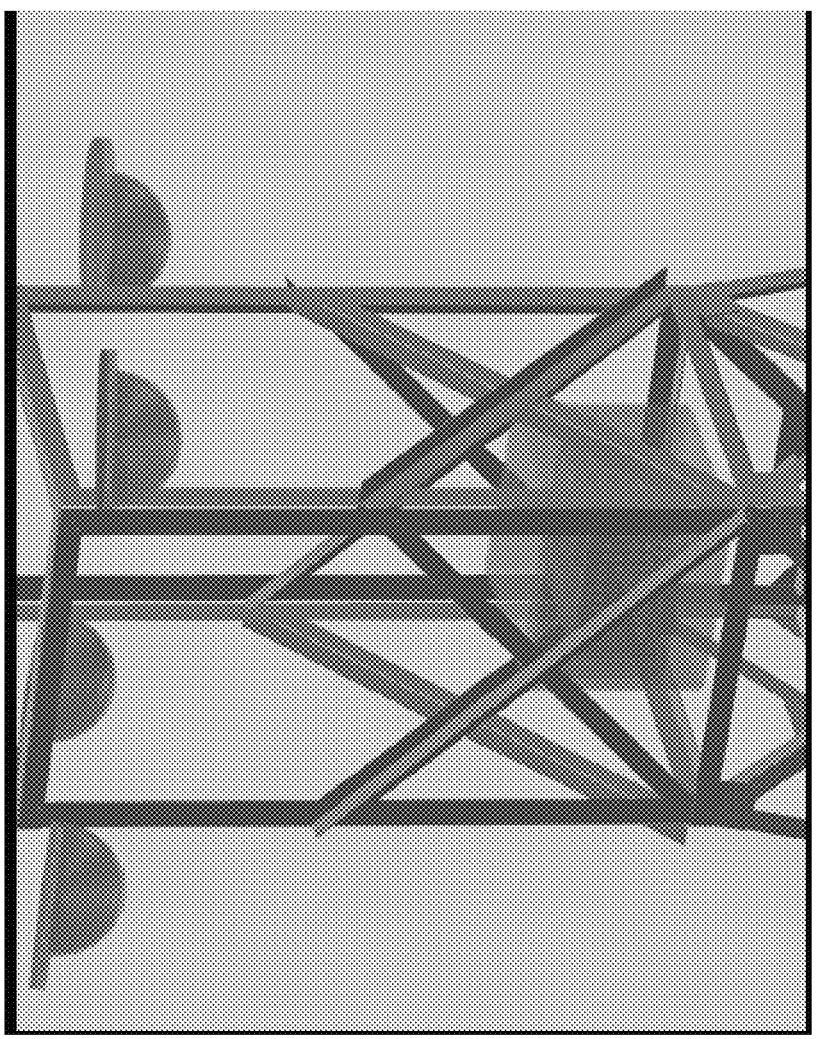
FIG. 16B shows an example of a cell tower configuration.

FIG. 16B shows an example of a cell tower configuration. Antenna deployment is shown along with the placement of electronics that implements the base station function functionality (central rectangular solid box) in a fixed wireless system. In the depicted embodiment, four antenna systems are used and could be configured to provide four quadrant coverage.

Figure 16C:
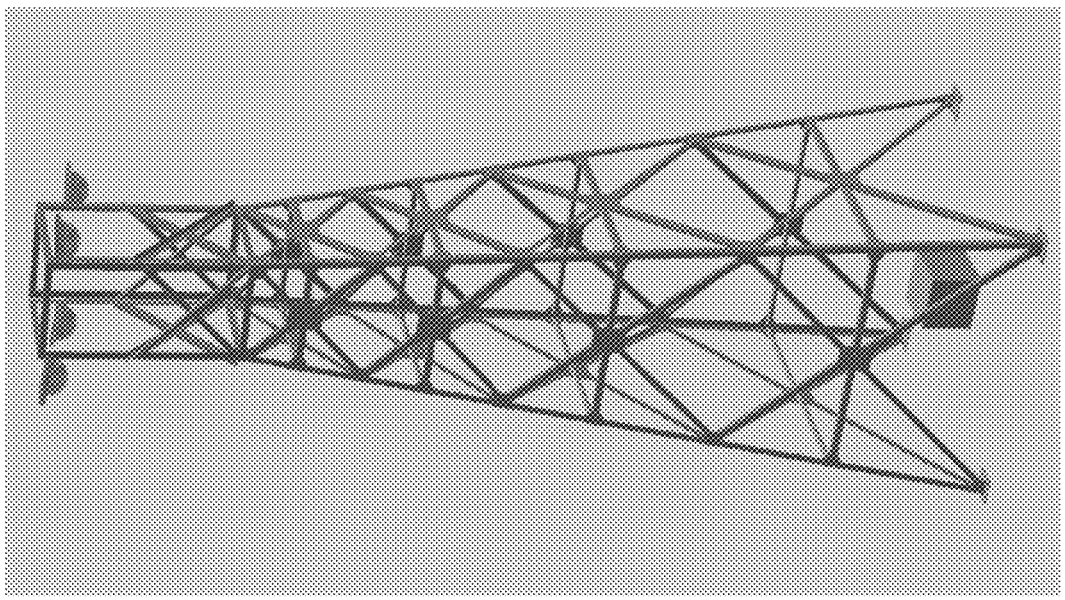
FIG. 16C shows an example of a cell tower configuration.

FIG. 16C shows yet another cell tower configuration in which base station electronics is located at a ground level for easy access by personnel, while antenna elements are positioned towards or at very top of the antenna tower.

The disclosed techniques may support up to 1000/b/sec/Hz peak PHY rate using TDD, a 1 msec TTI, a 4 MIMO antenna configuration with 32 beams (subsectors), and 40 MHz divided into four 10 MHz subbands. Data transmissions may be organized into 16 subgrids of a 64×8 array, with each subband supporting 64 to 512 bytes of data burst every millisecond per subband, depending on the constellation used for modulation. Put differently, 8K logically distinct data payloads could be simultaneously transmitted (or received), providing a 46 Gbps peak raw throughput rate per cell (32×4×40×10×0.9 Mbps).

Figure 17:
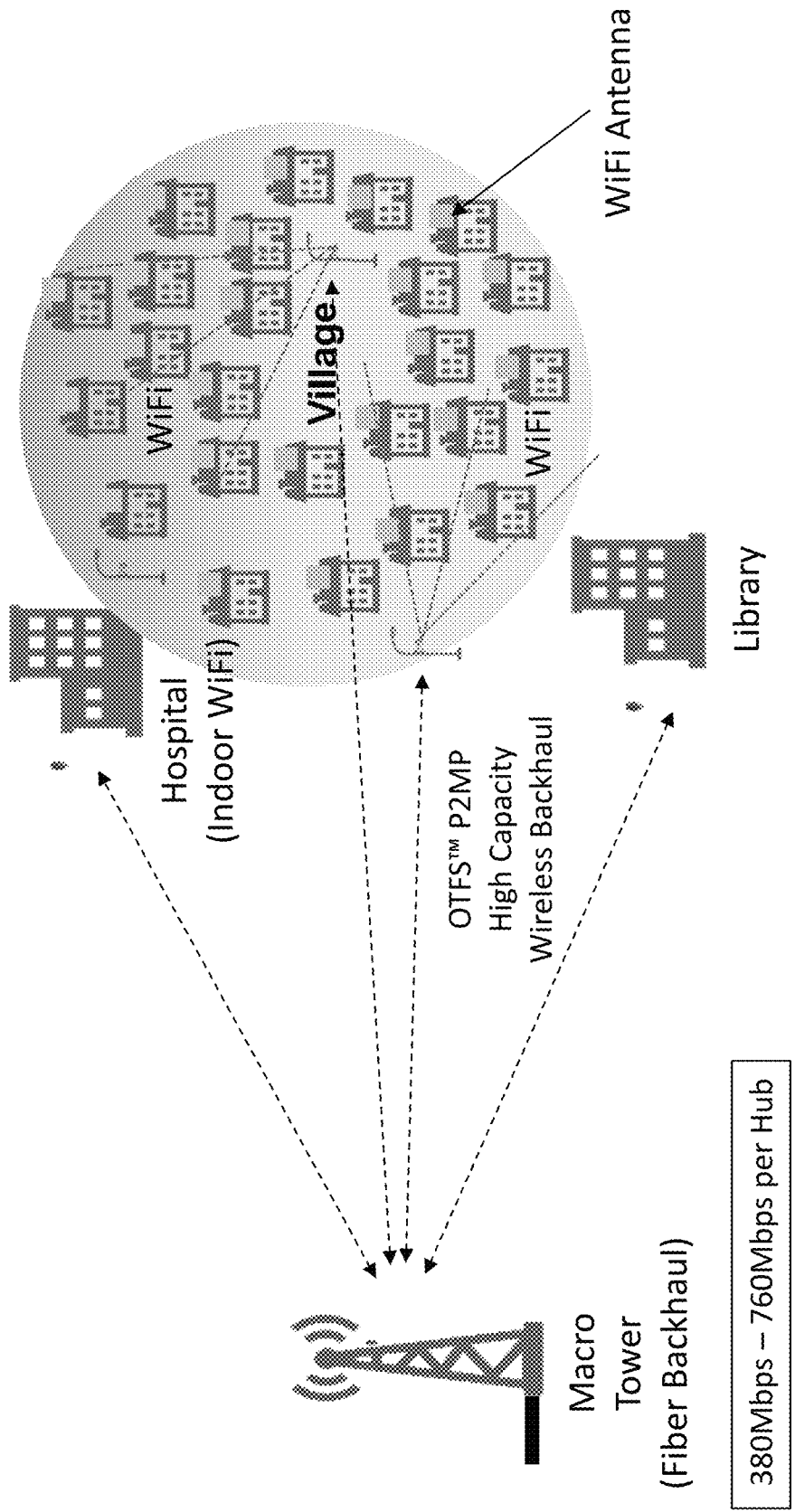
FIG. 17 shows an example of a system deployment in which OTFS is used for wireless backhaul.

FIG. 17 shows an example of a system deployment in which OTFS is used for wireless backhaul. A macro cell tower that is couple to a fiber backhaul may be equipped to carry 380 to 760 Mbps per hub to provide fixed wireless access to localities. The transmission distance may be organized in 500-meter range zones. The hub may be equipped with multiple 1 to N multipoint systems. In some embodiments, coarse angular separation may be achieved among different target zones. In some embodiments, multipoint coordination may be used to further improve transmission efficiency. In some embodiments, frequency and space division multiple access may be used.

Figure 18:
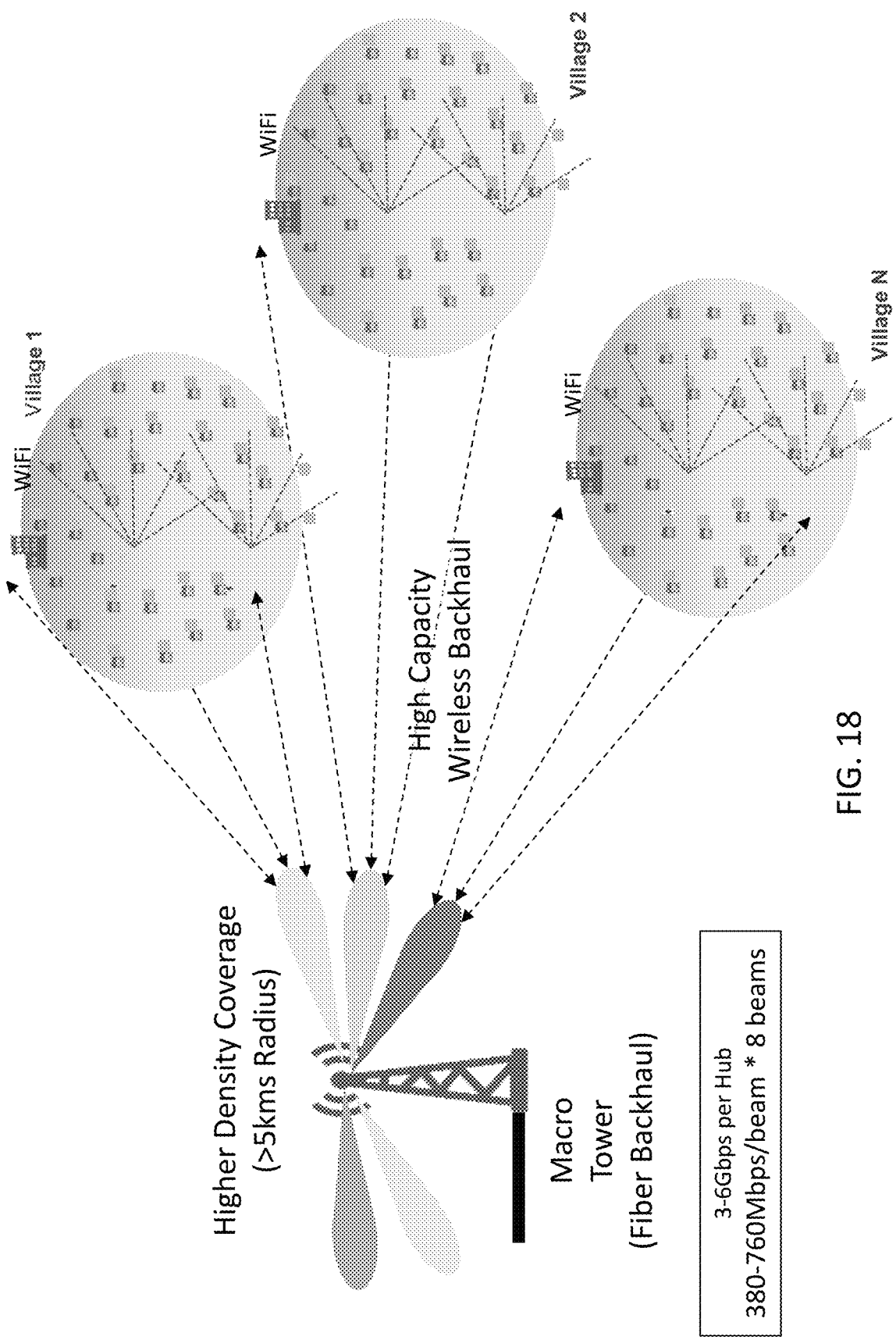
FIG. 18 shows another example of a system deployment in which OTFS is used for wireless backhaul.

FIG. 18 shows another example of a system deployment in which OTFS is used for wireless backhaul. Compared to the depiction in FIG. 17, the angular separation in the embodiment of FIG. 18 may be medium. The hub may be equipped with a Luneburg lens pencil beam antenna configuration to minimize transmission interference. In some embodiments, time, frequency and/or space division multiple access may be used to further improve efficiency. Such coverage may be used for longer-range fixed wireless access. For example, the distance between the macro tower and areas of coverage may be 5 Km. In the depicted embodiment, due to the availability of 8 beams, a total 3 to 6 Gbps bandwidth may be achieved per hub.

Figure 19:
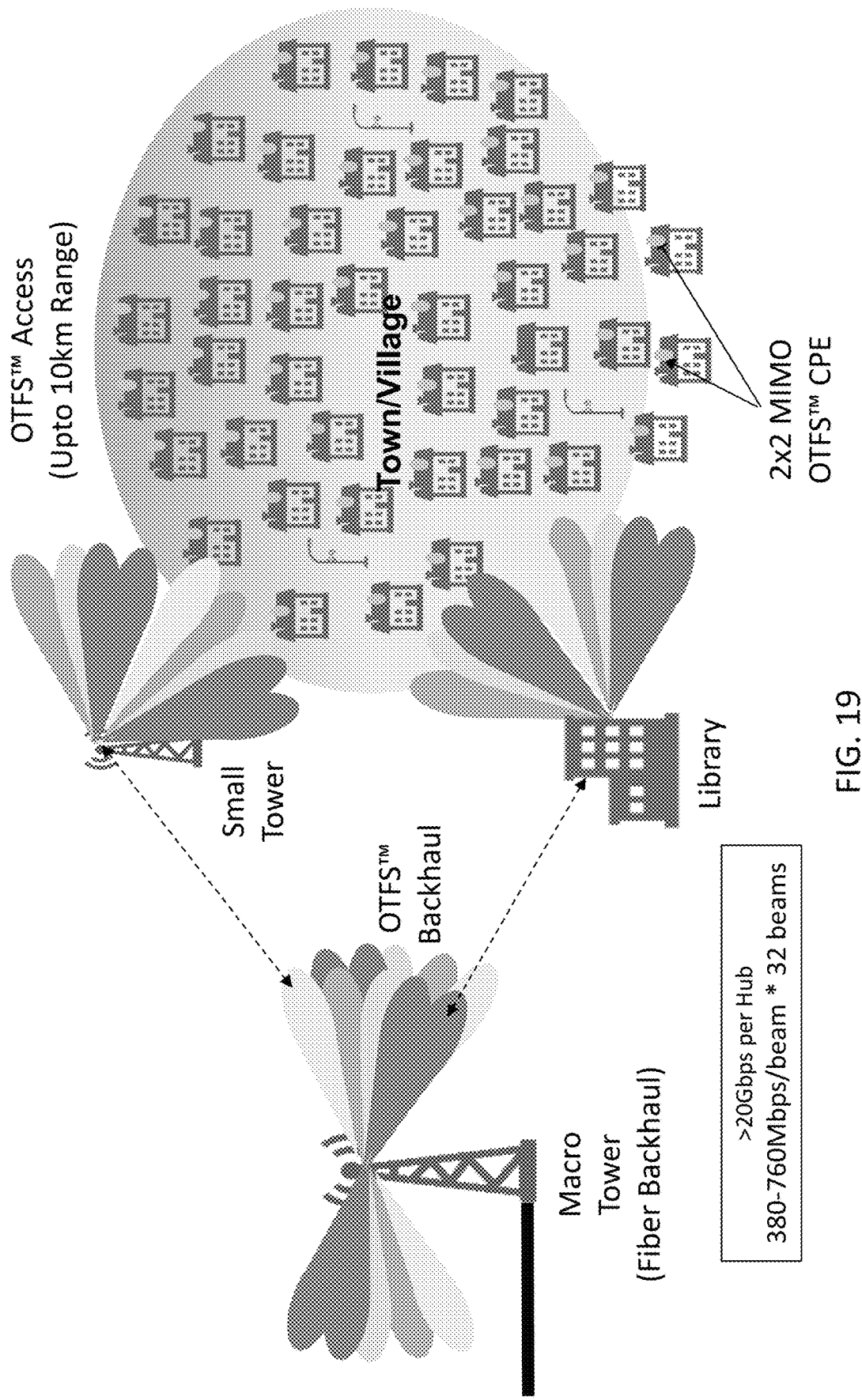
FIG. 19 shows an example deployment of an OTFS based fixed wireless access system.

FIG. 19 shows an example deployment of an OTFS based fixed wireless access system in which UE have MIMO antenna capability. The range of such a deployment may be extendible to up to 10 KM, with 32 beams being used for transmission (due to MIMO), thus providing greater than 20 Gbps bandwidth handling capability per hub. The angular separation among antenna beam may be finer than the embodiments depicted in FIG. 17 and FIG. 18, and MU-MIMO processing may be performed. In some embodiments, azimuthal interference cancellation may be employed to negate the overlap in pencil beams. In some embodiments, elevation beamforming may be used. In some embodiments, up to 4×4 MIMO antenna configuration may be used.

The use of OTFS modulation in the described deployments thus offers a way to achieve, or be close to, theoretical capacity at any MIMO or feedback mode. In some embodiments, a 3D channel representation may be used during acquisition processing. The OTFS modulation allows for timely, accurate and low overhead capturing of mutual coupling between all antenna pairs among all participants in the network.

Figure 20:
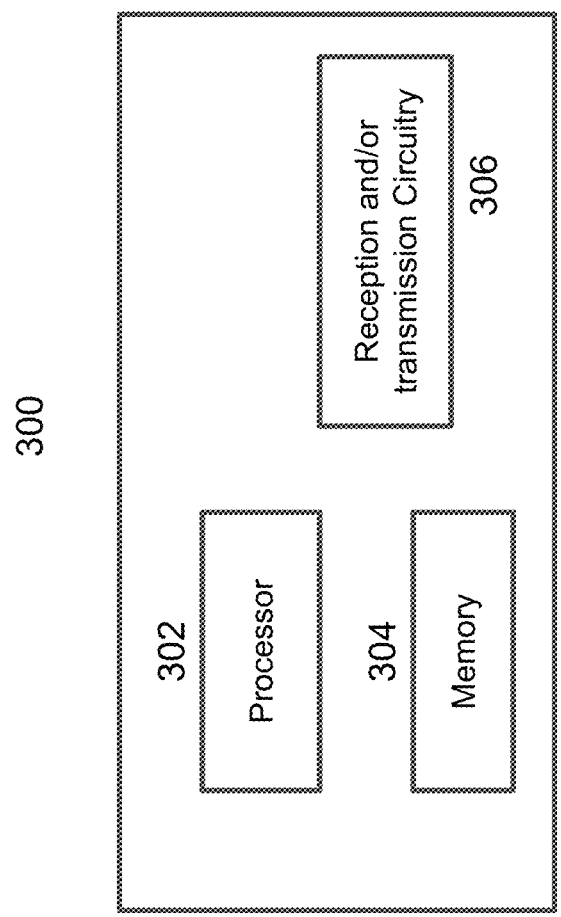
FIG. 20 shows an example of a wireless transceiver apparatus.

FIG. 20 shows an example of a wireless transceiver apparatus 300. The apparatus 300 may be used to implement method 200, 250. The apparatus 300 includes a processor 302, a memory 304 that stores processor-executable instructions and data during computations performed by the processor. The apparatus 300 includes reception and/or transmission circuitry 306, e.g., including radio frequency operations for receiving or transmitting signal and/or receiving data or information bits for transmission over a wireless network. OTFS can also be used to achieve High quality CSI for massive MIMO, CoMP & Full Duplex schemes. In another advantageous aspect, due to the stable geometry coordinates for delay, Doppler and angle or arrival, the resulting transmission schemes may exhibit Stationary, steady capacity, long coherence time and be able to Fully exploit the diversity offered by the channel for any packet size & data rate.

Accordingly, in some embodiments, an antenna system includes a substantially planar portion, a hemispherical dome attached to the substantially planar portion the base of the hemispherical dome. The antenna system includes one or more antenna elements positioned within the hemispherical dome, each antenna element communicatively coupled to a data feed and being able to transmit and/or receive data bursts according to a transmission scheme. The substantially planar portion is ideally perfectly planar (two-dimensional) but may be planar up to certain manufacturing tolerance—e.g., 0.01 percent deviation from the plane. Similar manufacturing tolerances may be allowed for the hemispherical shape of the dome. It may also be possible to design the dome to have an almost hemispherical shape (e.g., ellipsoidal) and the antenna focus may be adjusted accordingly via changes to dielectric layers within the hemispherical dome.

The antenna system may be used together with a transmission scheme that performs time-frequency multiplexing, delay-Doppler domain multiplexing, a spatial multiplexing and a stream/layer multiplexing. For example, transmitted or received signals may be generated using the OTFS modulation techniques for QAM signals, described in the present document.

In some embodiments, the planar portion may be configured with a heat sink or may act as a heat sink. In some embodiments, e.g., as described with reference to FIGS. 15A and 15B, the antenna elements may be organized as a PUMA array. In some embodiments, at least some of the antenna elements may be dipole antennas. As described with respect to FIGS. 15A, 15B, in some embodiments, the antenna elements placed along the hemispherical surface may be conformal to the round shape.

In some embodiments, the various antenna system embodiments described herein may be used for signal transmission reception in a fixed wireless access point apparatus. The wireless access point may provide signals to and receive signals from a number of wireless devices such as customer premises equipment. The fixed access point may be installed at the hub depicted in FIG. 1A, 1B, or 1C. The access point may transmit signals to (and receive signals from) the multiple remote sites using data bursts or transmissions using multiplexing and modulation techniques described in the present document.

Accordingly, in some embodiments, a method of data transmission or reception uses the antenna technology described herein for transmitting or receiving OTFS signals (or other transmission schemes such as OFDM, spatial multiplexing, layer multiplexing, etc.).

For example, using the method, the time frequency plane may be divided into grids, where grid elements represent time-frequency resource elements. Each receiver's signals may correspond to a sparse subset of all time-frequency resource elements (e.g., as is well known in the 3GPP art).

In one advantageous aspect, the above described techniques could be used to implement embodiments in which a compact, aesthetically pleasing antenna can be deployed at the network-side to provide internet and wide area connectivity to multiple receiver devices.

In another advantageous aspect, High Multiplexing Dimensionality of Time, Frequency, Space, Delay, Doppler, Angle of Arrival may be achieved. In some embodiments, adaptive resource allocation may be used to achieve desired payload delivery attributes (Network capacity, link budget, reliability, latency, granularity, throughput, etc.).

It will be appreciated that the disclosed techniques can be used for implementing high bandwidth fixed wireless access systems.

Examples of signal multiplexing schemes are also disclosed in PCT/US16/50579, entitled "Multiple Access Using Orthogonal Time Frequency Space Modulation," having international filing date 7 Sep. 2016, which is incorporated by reference herein in its entirety.

FIG. 20 shows an example of a wireless transceiver apparatus 300. The apparatus 300 may be used to implement various techniques described herein. The apparatus 300 includes a processor 302, a memory 304 that stores processor-executable instructions and data during computations performed by the processor. The apparatus 300 includes reception and/or transmission circuitry 306, e.g., including radio frequency operations for receiving or transmitting signal and/or receiving data or information bits for transmission over a wireless network.

Example Features of OTFS Air Interface

OTFS is a modulation scheme in which signals are either generated or received by performing processing in the delay-Doppler domain (instead of the traditional time-frequency domain). The two-dimensional delay-Doppler domain is obtainable from the two-dimensional time-frequency domain via an orthogonal transformation. Processing in the delay-Doppler domain can be beneficial to certain embodiments due to the ability to represent a stable and deterministic geometry of a wireless channel.

The two-dimensional basis functions used in the OTFS domain (delay-Doppler domain) could achieve the effect of spreading energy in an information symbol over time and frequency dimensions. For example, an "impulse" basis function in the OTFS domain may occupy entire spectrum of a channel. One advantageous aspect is that channel estimation becomes an efficient, accurate and compact process. The ability to transmit signals by composing them in the delay-Doppler domain, pilot signals can achieve high density in both the time-frequency (e.g., OFDM) and the delay-Doppler (e.g., OTFS) domain. OTFS signal processing enables linear scaling of performance as a function of the multi-input, multi-output (MIMO) order in mobility scenarios. Performance of such communication systems can be made robust against Doppler fades.

Figure 21:
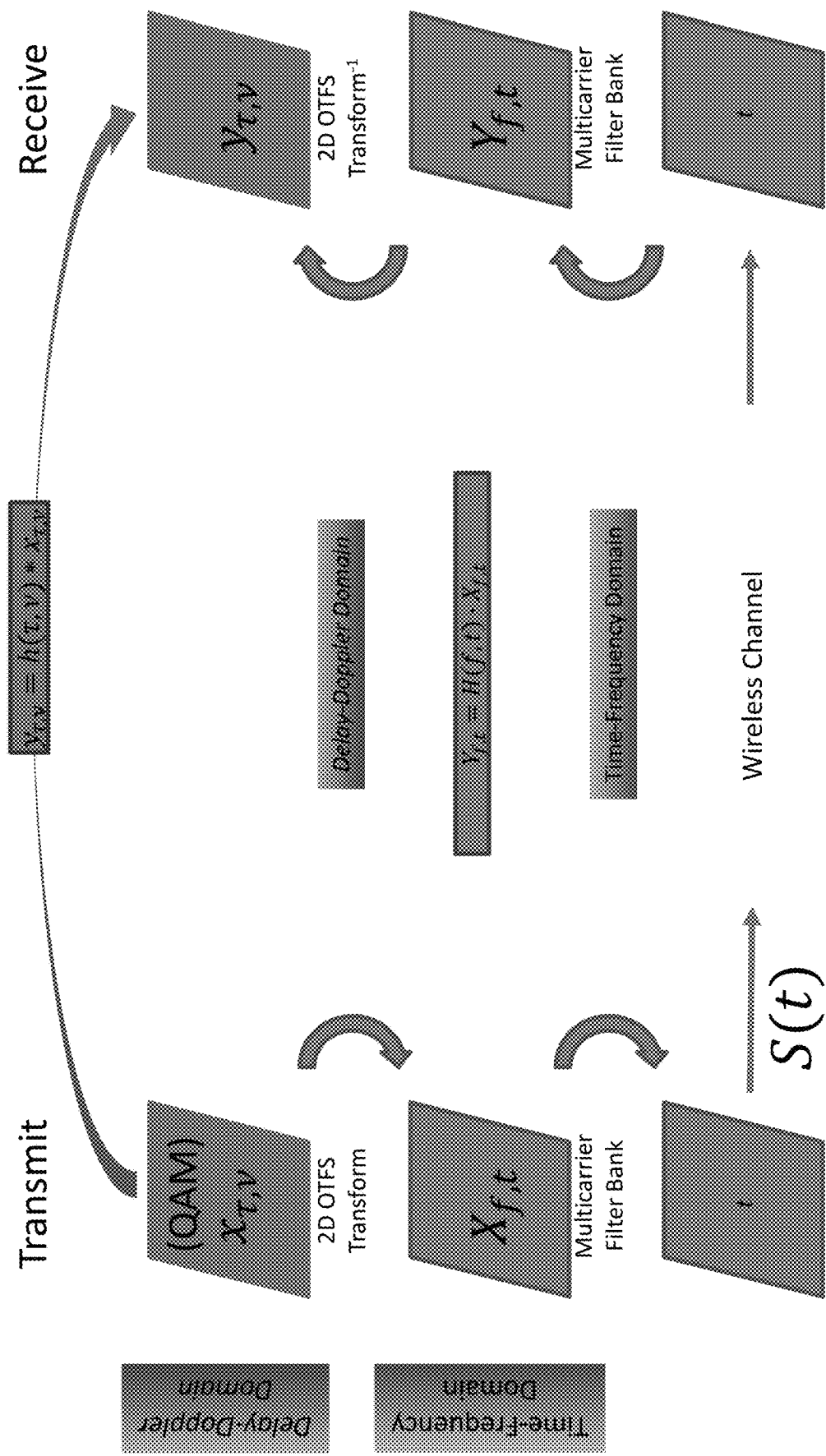
FIG. 21 pictorially depicts an example process of transforming data between a delay-Doppler representation and a time-frequency representation.

FIG. 21 pictorially depicts an example process of transforming data between a delay-Doppler representation and a time-frequency representation. The transmit side may be represented either in the delay-Doppler domain (top) or time-frequency domain (bottom). A two-dimensional OTFS transform could be used to translate a QAM signal representation from the OTFS domain to the OFDM domain. The OFDM signal may be converted in to a time-domain waveform s(t). The resulting signal could be transmitted over a wireless channel (center) to a receiver-side (right hand side).

At the receiver side, a multicarrier filter bank could be used to recover the received signal in the time-frequency domain, which then can be transformed back into the OTFS domain using inverse OTFS transform to recover the QAM signal in the delay-Doppler domain that was transmitted.

Figure 22:
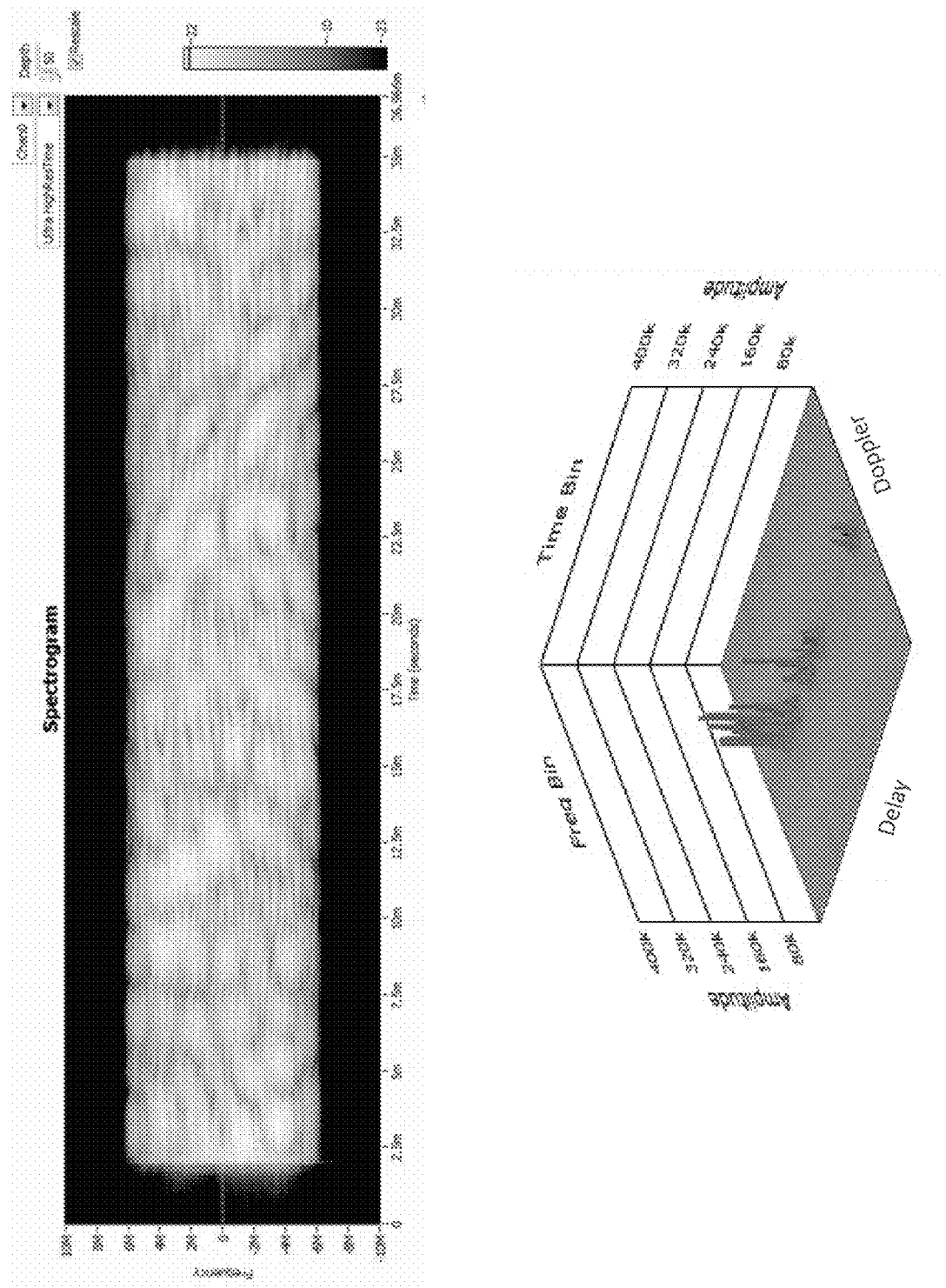
FIG. 22 shows a spectrogram of an example of a wireless communication channel.

FIG. 22 shows a spectrogram of an example of a wireless communication channel that may be used for the transmissions described with reference to FIG. 21. The spectrogram shown represents the 3GPP ETU-300 channel, and the corresponding delay-Doppler domain representation shows a 300 Hz maximum Doppler shift and 5 microsecond delay spread for the channel.

Figure 23:
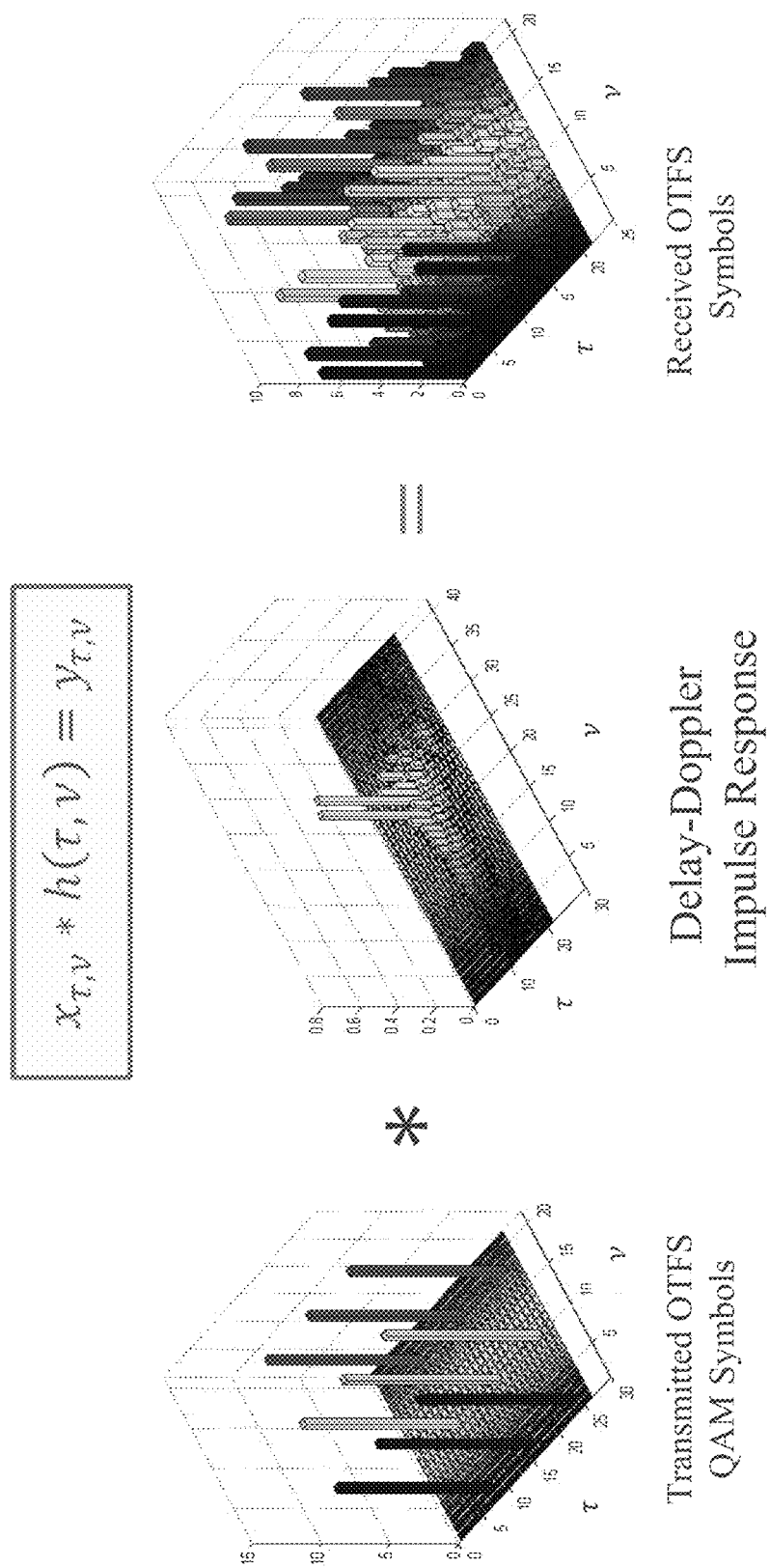
FIG. 23 pictorially depicts the effect of a wireless channel on signal transmissions, as represented in the delay-Doppler domain.

FIG. 23 pictorially depicts the effect of a wireless channel on signal transmissions, as represented in the delay-Doppler domain. As depicted, transmitted OTFS QAM symbols are modified by the impulse response of the wireless channel to product received OTFS symbols. This process is mathematically represented as:

$$X_{\tau,v} * h(\tau,v) = y_{\tau,v}$$

In the above equation, (τ, v) represents the two-dimensional (delay, Doppler) plane and the "*" operation represents convolution.

Figure 24:
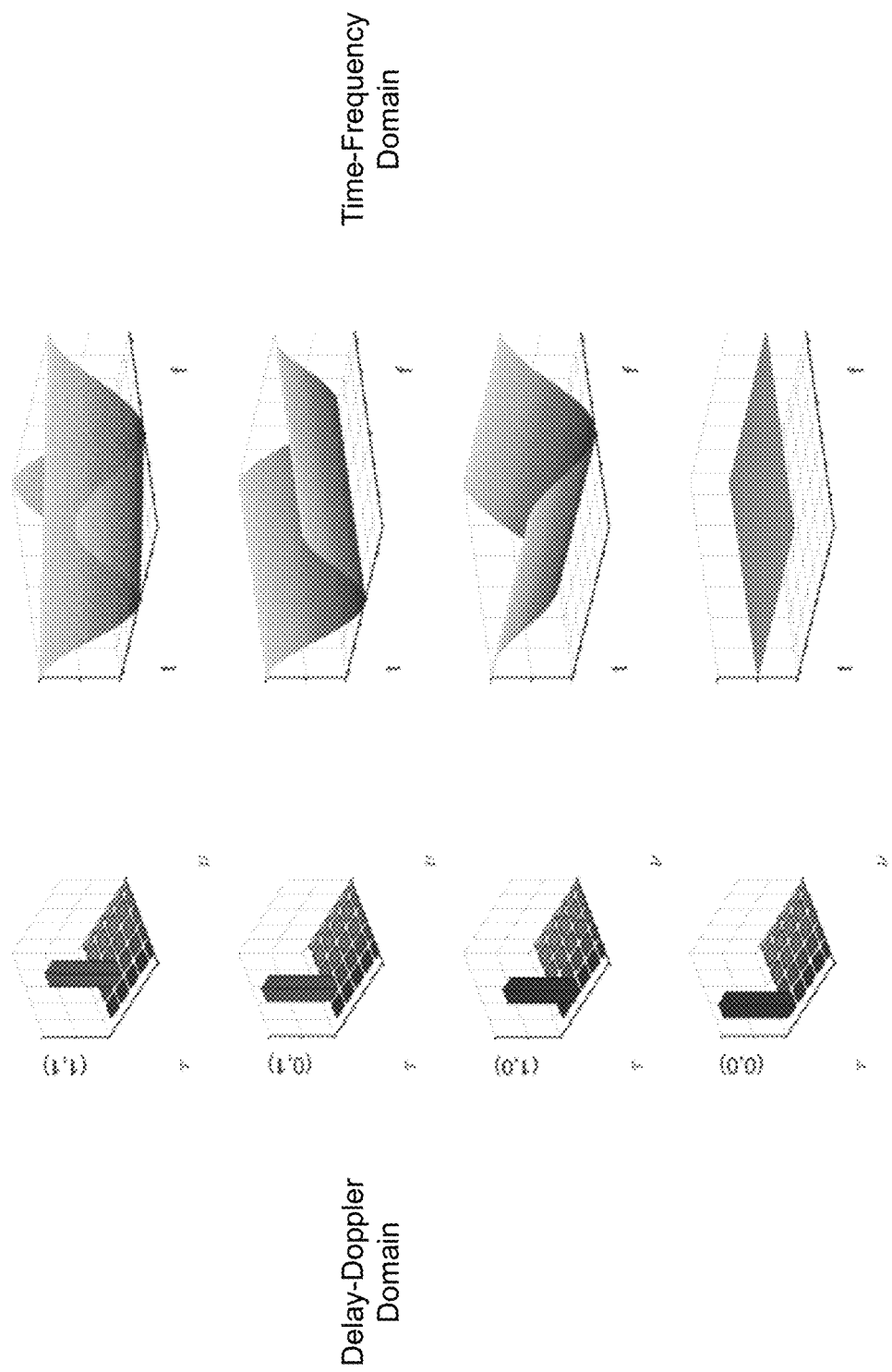
FIG. 24 shows an example of a basis function depicted in time-frequency and delay-Doppler domains.

FIG. 24 shows an example of a basis function depicted in time-frequency and delay-Doppler domains. The example depicts OTFS basis function (0,0), (0,1), (1,0), and (1,1) as their corresponding t-f waveforms.

FIG. 25 pictorially depicts examples of insertion of a pilot signal and overlay of a pilot signal. On the left, an example pilot insertion scheme is shown in which the pilot signals (top) are inserted in to data signals that do not occupy the delay-Doppler resources to be used by pilots (middle drawing) to generate an OTFS signal (bottom left). On the right, an example pilot overlay is shown in which pilots are inserted into a data signal and may occupy same resources as data signal. The pilot overlay technique is particularly advantageous because new use cases (e.g., higher order MIMO systems or high speed cases) may typically result in higher pilot overhead due to either increased number of pilot signals or closer placement of pilot signals. In such cases, simply allocating more and more resource elements to pilot transmissions may be a scalable solution. Therefore, the novel non-orthogonal multiplexing offered by OTFS provides a solution that can increase availability of pilot signals with no additional bandwidth overhead.

Figure 26:
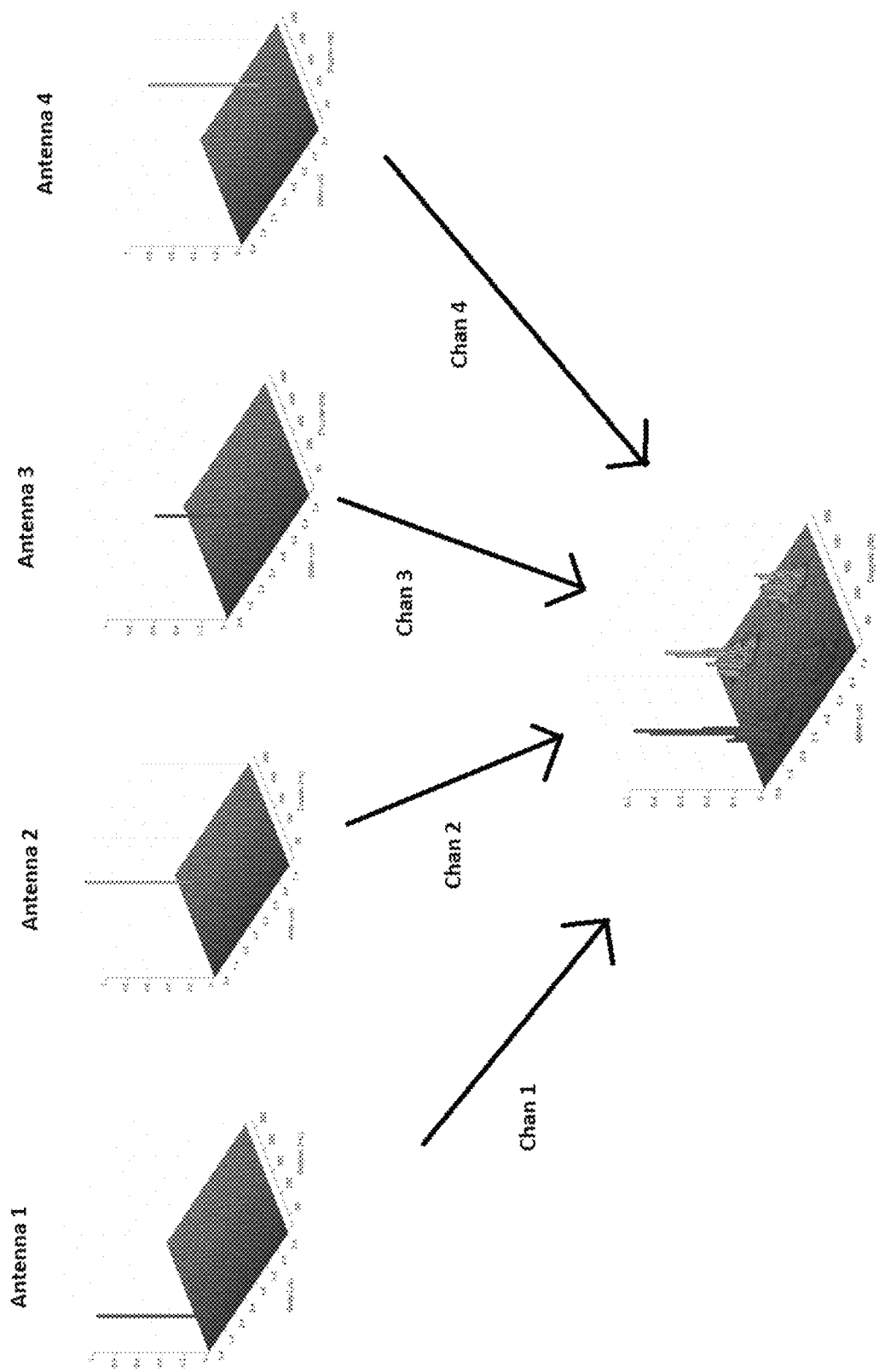
FIG. 26 shows an example of multiplexing operation in OTFS signals.

FIG. 26 shows an example of multiplexing operation in OTFS signals. An example of multiplexing pilot signals for four antennas as four channels, resulting into a multiplexed OTFS signal.

Figure 27:
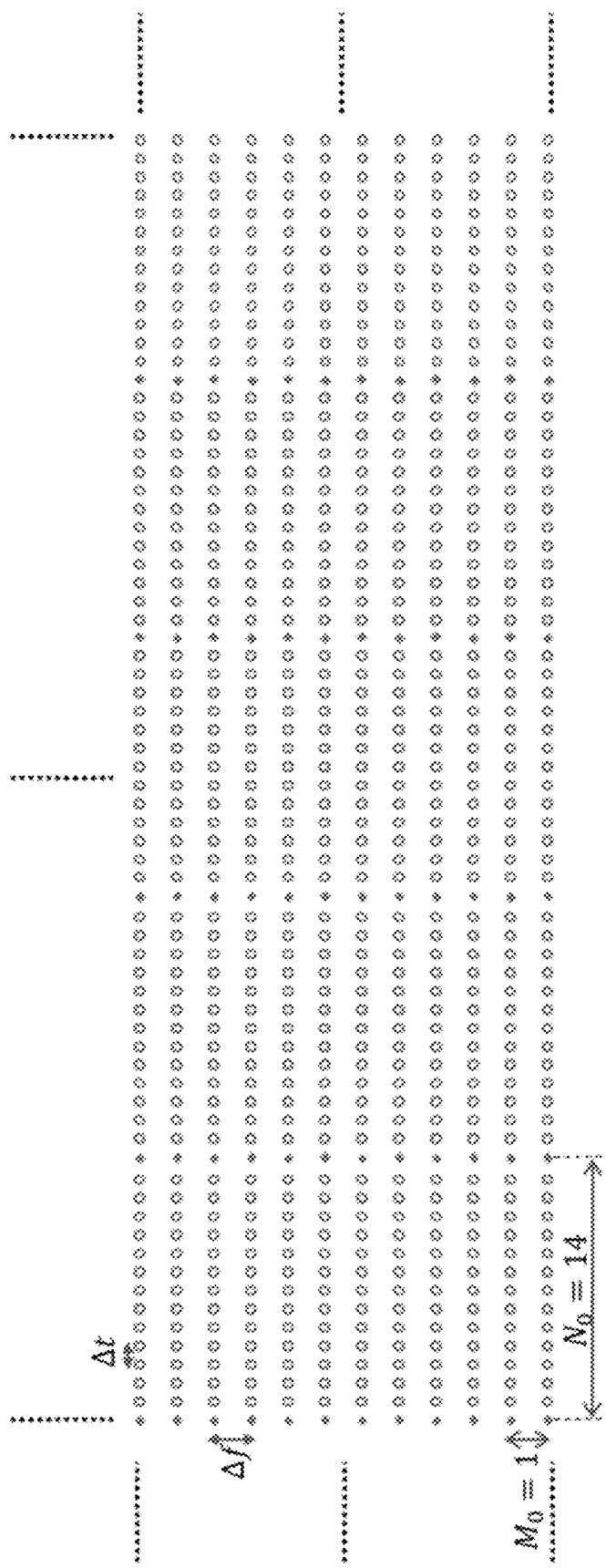
FIG. 27 shows an example of multiplexing of data and pilot signals along an OTFS lattice.

FIG. 27 shows an example of multiplexing of data and pilot signals along an OTFS lattice. As depicted, in some embodiments, the data and pilot lattice points may be multiplexed such that pilot signals occupy every 14th time index, thereby giving MΔf=pilot frequency spacing; NΔt=pilot time spacing, where M=1 and N=14.

Figure 28:
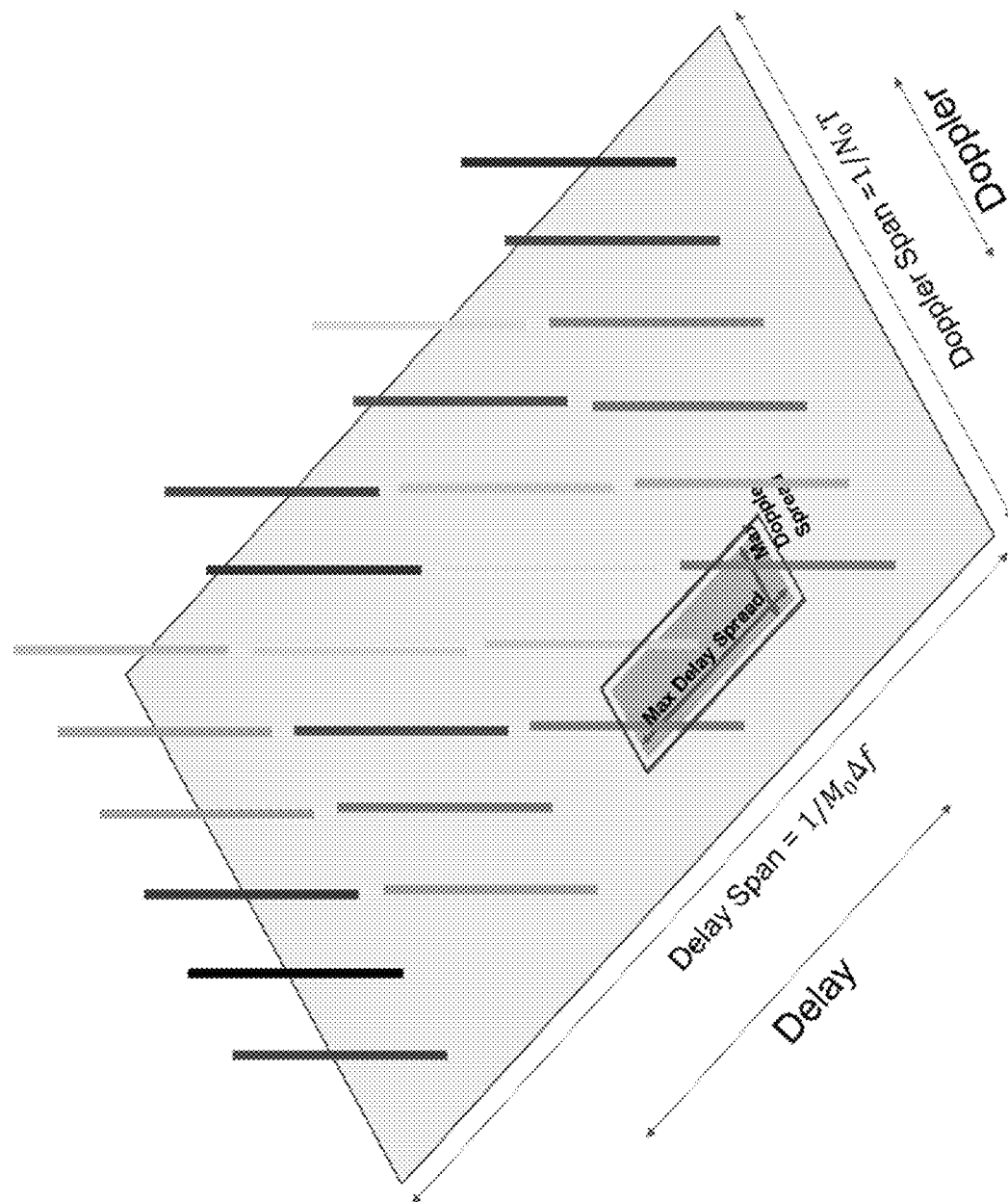
FIG. 28 shows an example of placement of 24 antenna port/reference signals along a delay-Doppler grid.

FIG. 28 shows an example of placement of 24 antenna port/reference signals along a delay-Doppler grid. The pilot separation marks the maximum delay and Doppler spread that may be effectively combatted by using such reference signals.

FIG. 29 is a tabular comparison of reference signal examples in LTE and OTFS implementations. The table compares numbers of antenna ports that can be multiplexed when using OTFS modulation, as compared to the traditional LTE technology. The antenna embodiments described with respect to FIG. 1 to FIG. 20 may be used for transmission or reception of OTFS signals, among other uses.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A system for wireless communication, comprising:
a plurality of antenna systems; and
an electronic circuit communicatively coupled to the plurality of antenna systems,
wherein each of the plurality of antenna systems comprises:
a substantially planar portion comprising a heat sink,
a dome attached to the substantially planar portion at a base of the dome, wherein the dome includes a layered Luneburg lens comprising a plurality of dielectric layers of varying dielectric constants, and
one or more antenna elements positioned within the dome, wherein each of the one or more antenna elements is communicatively coupled to a data feed and is configured to communicate a plurality of data bursts, wherein each data burst of the plurality of data bursts comprises a signal that is generated in a delay-Doppler domain and converted to a time-frequency domain using an orthogonal transformation,
wherein the electronic circuit is configured to implement a functionality of a base station in a fixed wireless access system,
wherein the base station is configured to multiplex transmissions to or from a plurality of user devices, and wherein the transmissions overlap in the time-frequency domain.

2. The system of claim 1, wherein the plurality of antenna systems comprises four antenna systems, each antenna system configured to provide quadrant coverage.

3. The system of claim 2, wherein the plurality of data bursts is configured to be communicated using a time division duplexing (TDD) scheme.

4. The system of claim 3, wherein the TDD scheme is configured to provide a peak raw throughput of 46 Gbps and a maximum data rate of 1000 bits/sec/Hz.

5. The system of claim 3, wherein the TDD scheme is configured to use a 1 msec transmission time interval (TTI).

6. The system of claim 2, wherein each of the plurality of antenna systems comprises a multiple-input multiple-output (MIMO) antenna with 32 beams that is configured to operate in a 10 MHz frequency band.

7. The system of claim 6, wherein the each data burst comprises 64 bytes to 512 bytes of data every millisecond in the 10 MHz frequency band.

8. The system of claim 1, wherein the orthogonal transformation comprises a symplectic Fourier transform, and wherein the data burst is transmitted or received using an orthogonal time frequency space (OTFS) modulation.

9. The system of claim 1, wherein the one or more antenna elements are arranged as a planar ultrawideband phased array (PUMA) antenna array.

10. The system of claim 9, wherein the PUMA antenna array comprises an interface with a high-bandwidth network connection.

11. The system of claim 1, wherein each of the one or more antenna elements comprises a dipole antenna.

12. The system of claim 1, wherein the dome is a hemispherical dome.

13. The system of claim 1, wherein the dome is an ellipsoidal dome.

14. A method of wireless communication, comprising:
receiving, using an antenna system, a plurality of data bursts, wherein each data burst of the plurality of data bursts comprises a signal that is generated in a delay-Doppler domain and converted to a time-frequency domain using an orthogonal transformation, and
wherein the antenna system comprises:
a substantially planar portion comprising a heat sink,
a dome attached to the substantially planar portion at a base of the dome, wherein the dome includes a layered Luneburg lens comprising a plurality of dielectric layers of varying dielectric constants, and
one or more antenna elements positioned within the dome, wherein each of the one or more antenna elements is communicatively coupled to a data feed and configured to communicate the plurality of data bursts.

15. The method of claim 14, wherein the dome is a hemispherical dome.

16. The method of claim 14, wherein the dome is an ellipsoidal dome.

17. The method of claim 14, wherein the antenna system is configured to support a fiber backhaul link that supports a throughput between 380 Mbps and 760 Mbps.

18. The method of claim 14, wherein the orthogonal transformation comprises a symplectic Fourier transform, and wherein the plurality of data bursts is communicated using an orthogonal time frequency space (OTFS) modulation.

19. The method of claim 14, wherein the one or more antenna elements are arranged as a planar ultrawideband phased array (PUMA) antenna array.

20. The method of claim 14, wherein each of the one or more antenna elements comprises a dipole antenna.

* * * * *